Figure 1:
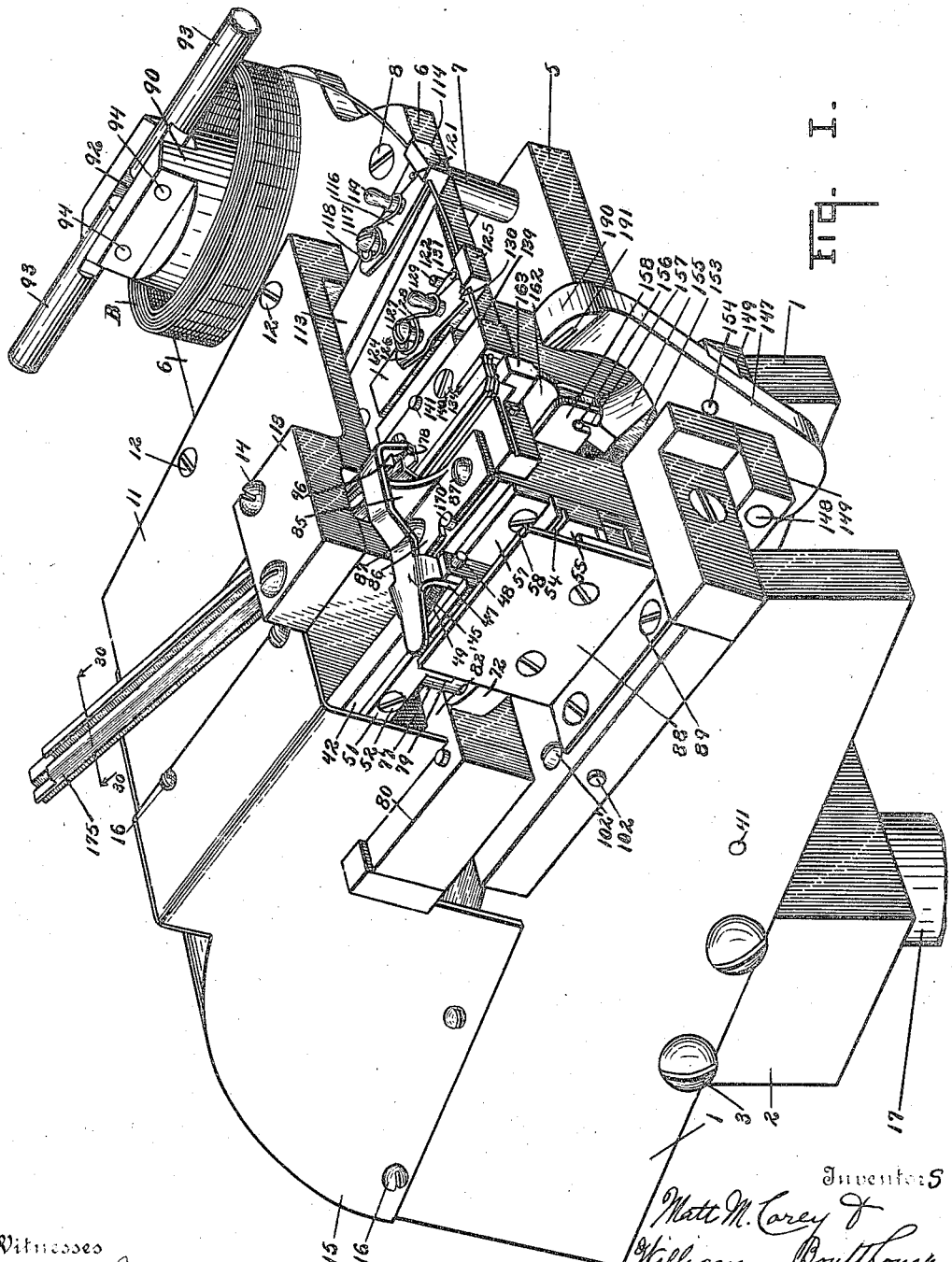

M. M. COREY & W. BOULTHOUSE.
BUTTON ATTACHING MACHINE.
APPLICATION FILED MAY 25, 1914.

1,121,613.

Patented Dec. 22, 1914.
9 SHEETS—SHEET 1.

Witnesses
K. Leedandies
M. L. Glasgow

Inventors
Matt M. Corey &
William Boulthouse
By Chappell & Earl
Attorneys

M. M. COREY & W. BOULTHOUSE.
BUTTON ATTACHING MACHINE.
APPLICATION FILED MAY 25, 1914.
1,121,613.
Patented Dec. 22, 1914.
9 SHEETS—SHEET 2.
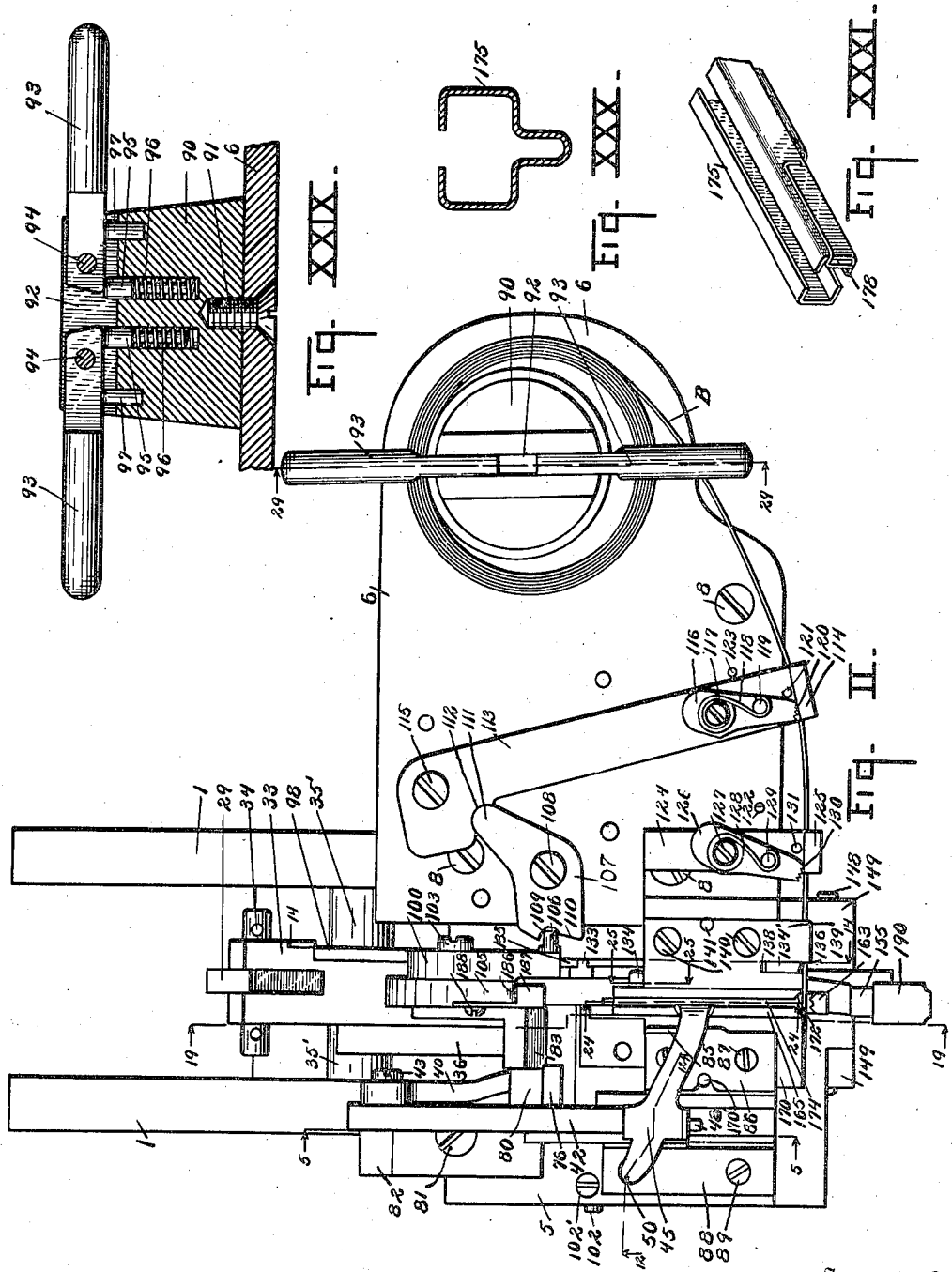
Witnesses
Inventors
Matt M. Corey
William Boulthouse
By Chappell & Earl
Attorneys

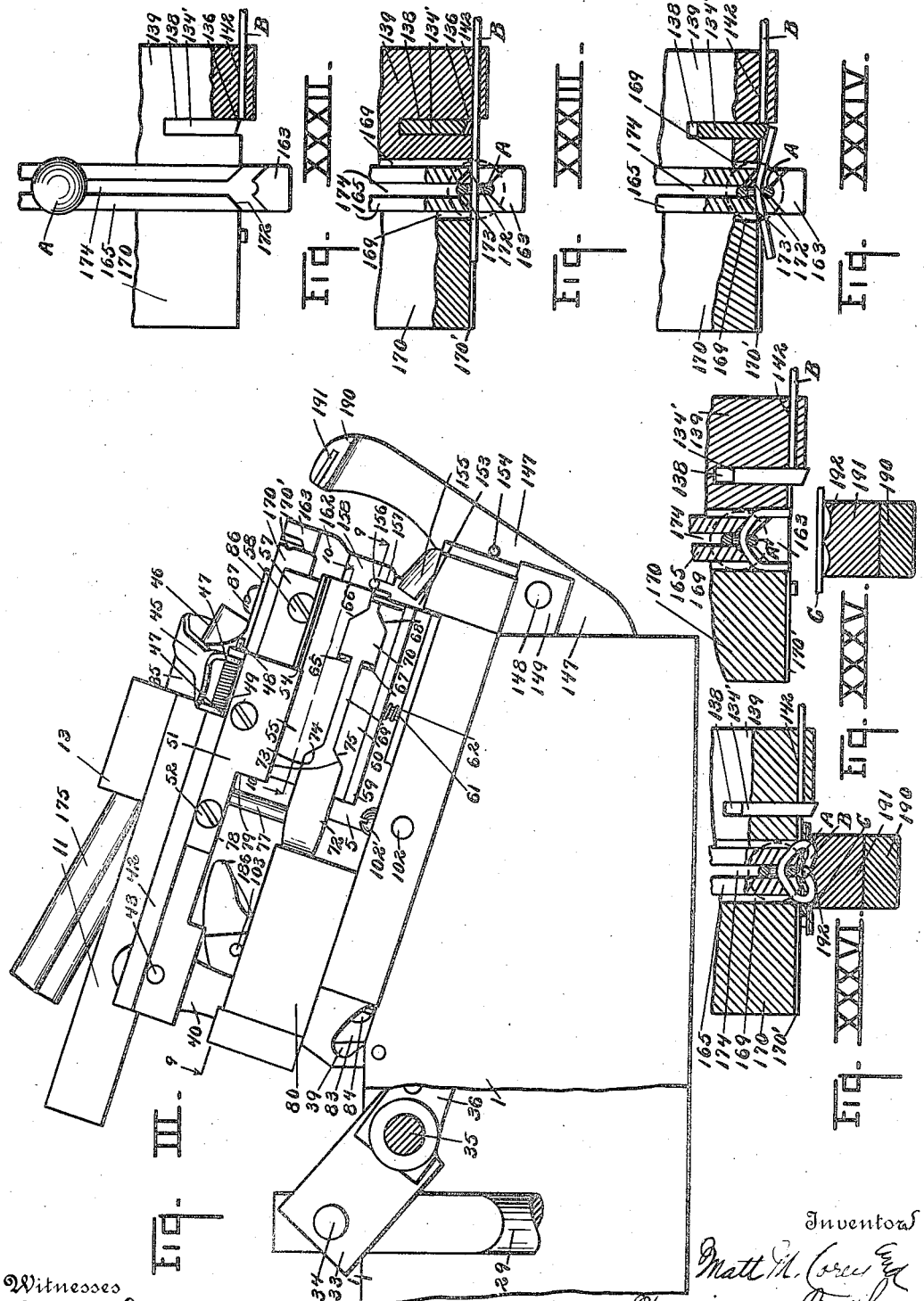

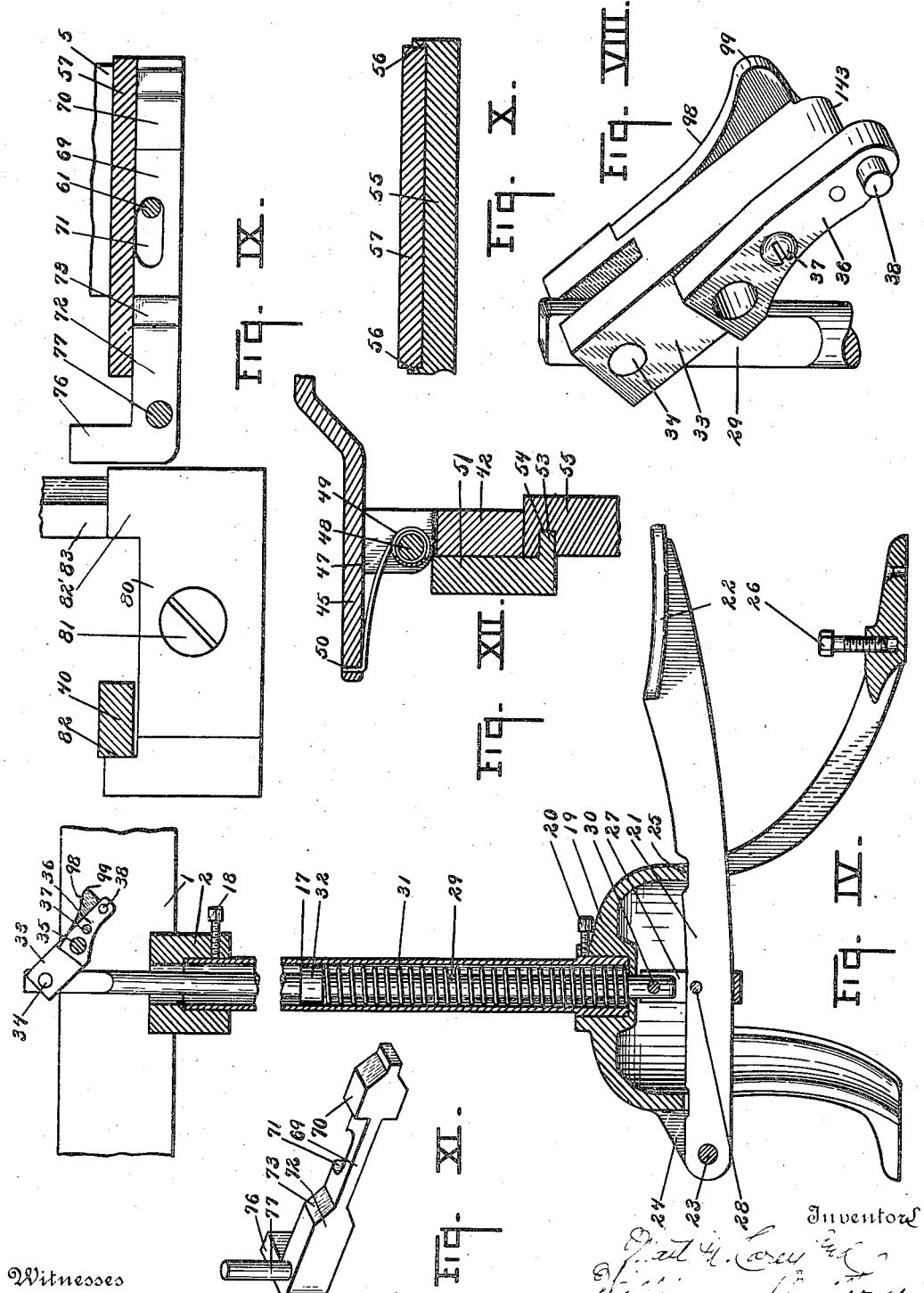

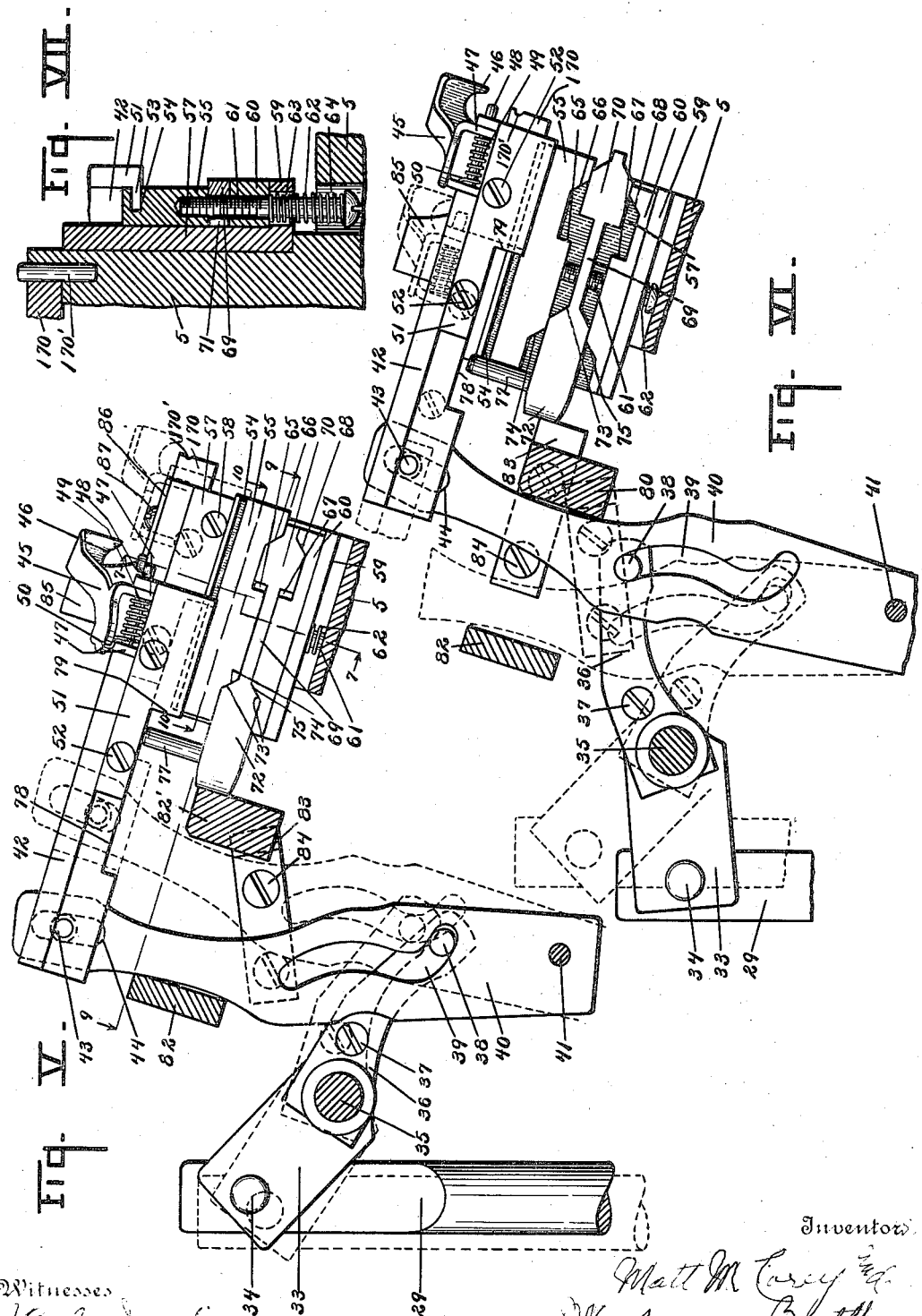

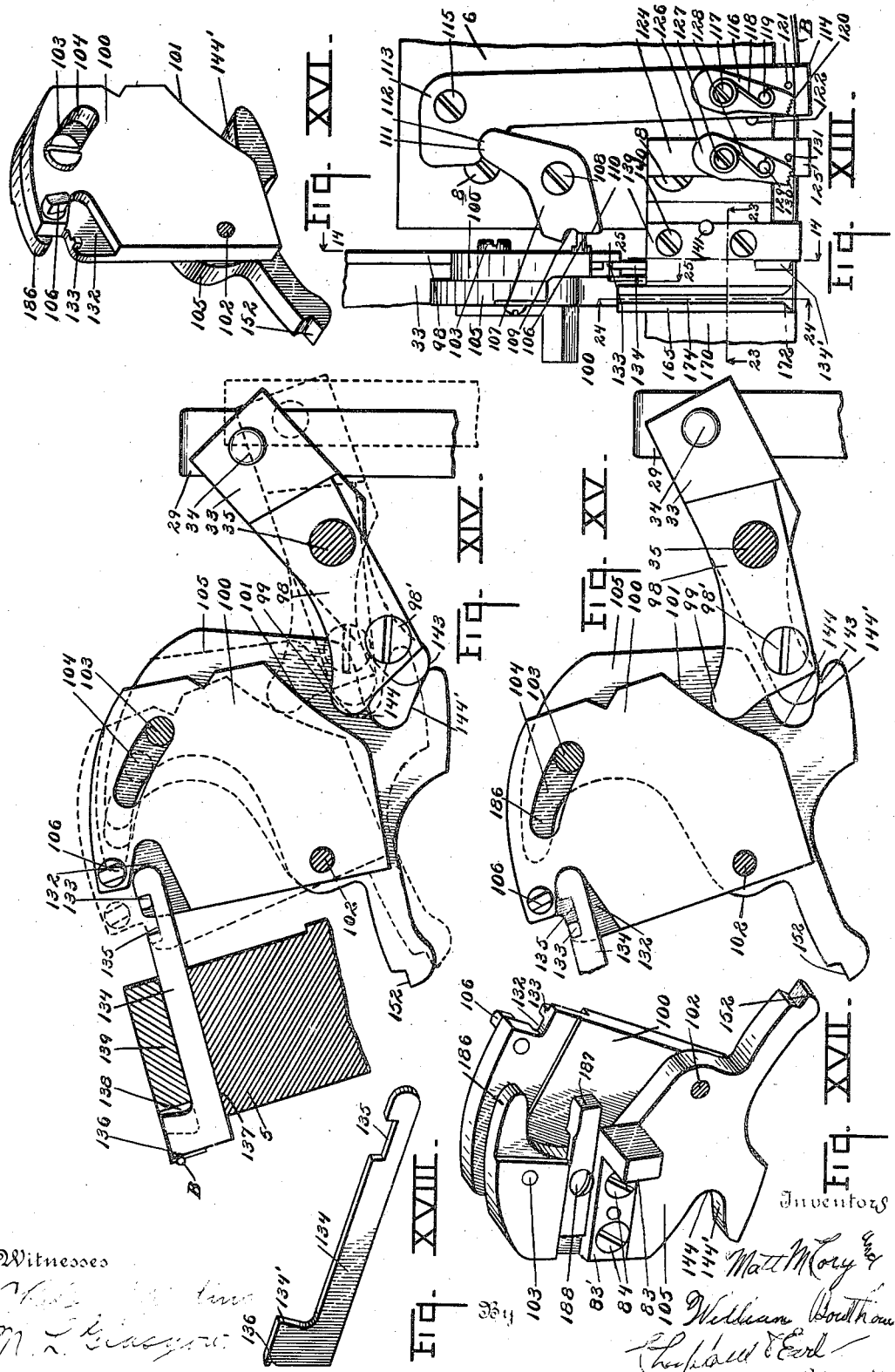

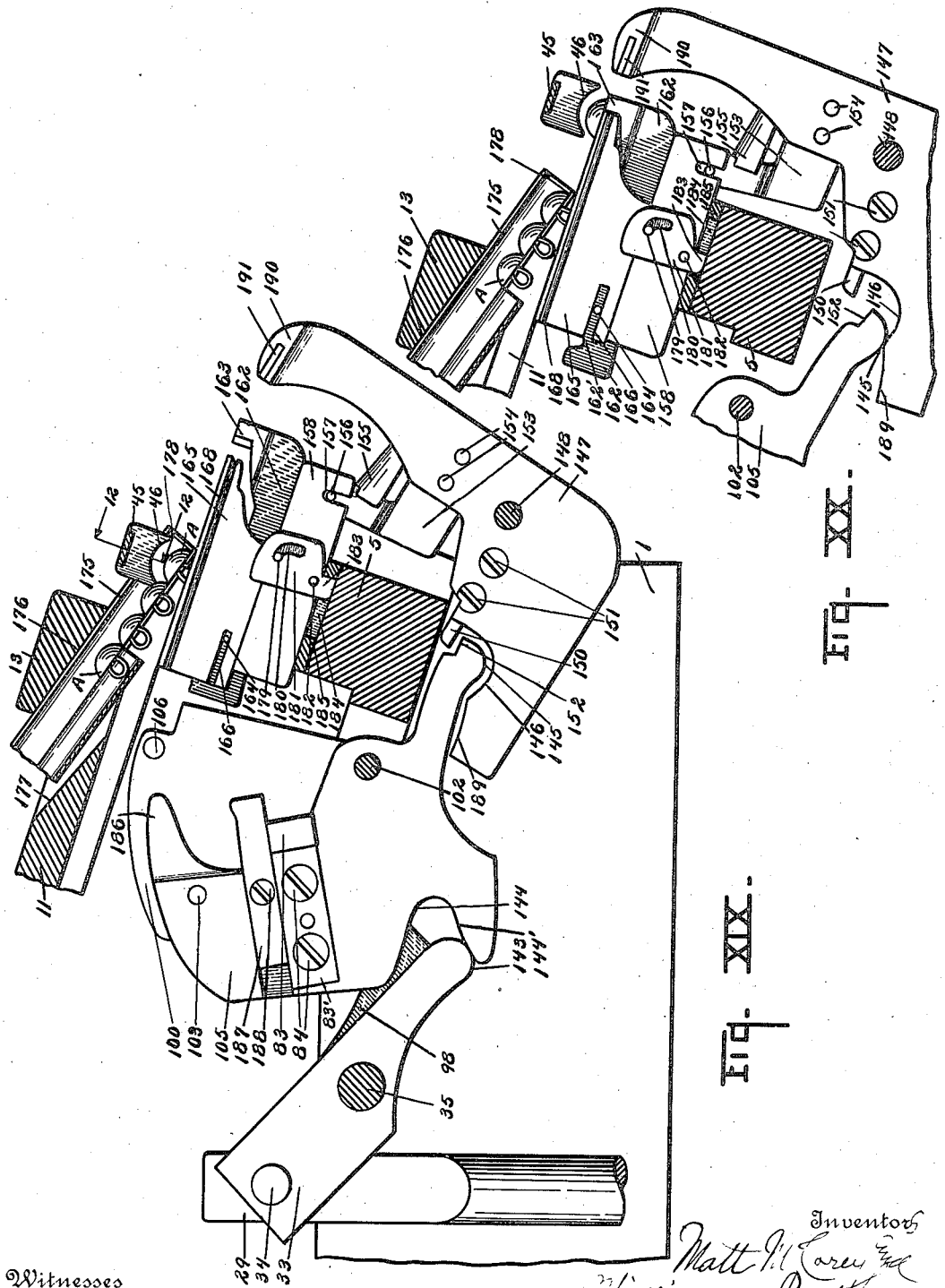

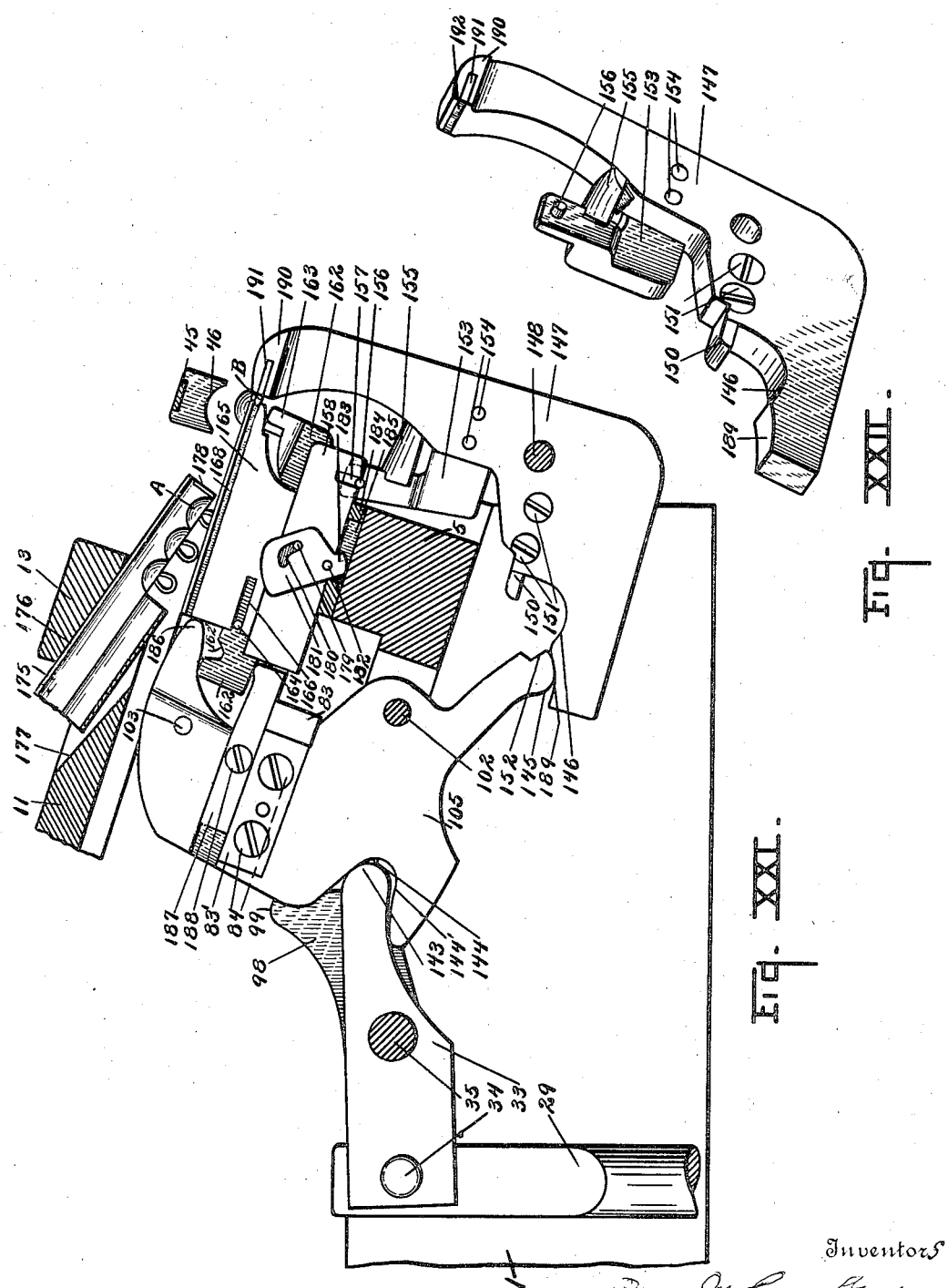

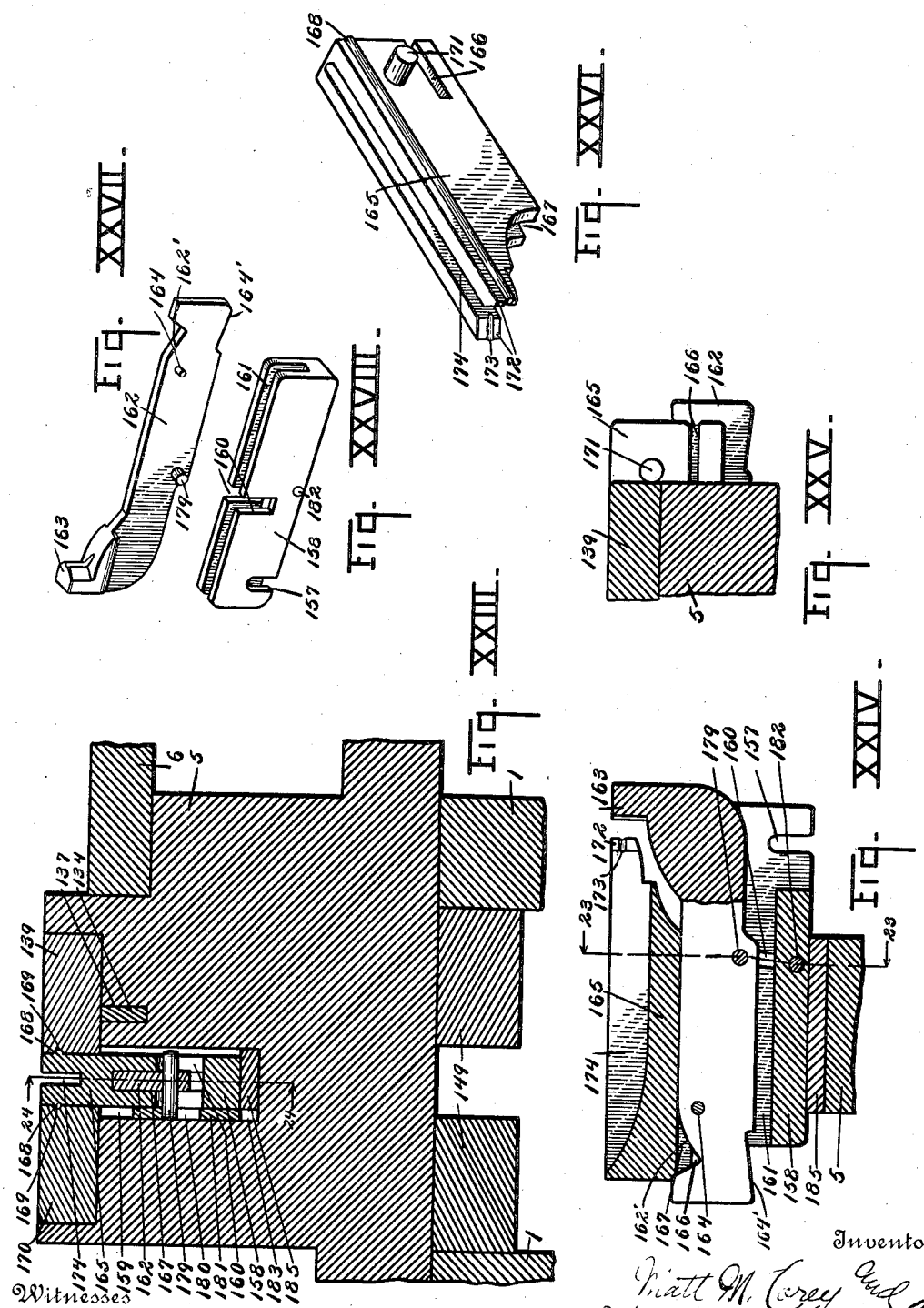

UNITED STATES PATENT OFFICE.

MATT M. COREY AND WILLIAM BOULTHOUSE, OF MUSKEGON, MICHIGAN, ASSIGNORS OF ONE-THIRD TO ASA M. COMSTOCK, OF MUSKEGON, MICHIGAN.

BUTTON-ATTACHING MACHINE.

1,121,613.　　　　Specification of Letters Patent.　　Patented Dec. 22, 1914.

Application filed May 25, 1914. Serial No. 840,849.

*To all whom it may concern:*

Be it known that we, MATT M. COREY and WILLIAM BOULTHOUSE, citizens of the United States, residing at Muskegon, Michigan, have invented certain new and useful Improvements in Button-Attaching Machines, of which the following is a specification.

This invention relates to improvements in button attaching machines.

The objects of this invention are: First, to provide a new and improved button attaching machine which is provided with button feeding mechanism, wire feeding and wire cutting mechanisms and staple forming, driving and clenching mechanisms, said mechanisms and their actuating parts being very compactly arranged and organized so as to produce a machine requiring but little space for its operation. Second, to provide, in a machine of the class described, an improved button feeding mechanism. Third, to provide, in a machine of the class described, improved staple forming mechanism and means for actuating the same. Fourth, to provide, in a machine of the class described, improved staple driving and clenching mechanism and means for actuating the same.

Further objects, and objects relating to details and economies of construction and operation will definitely appear from the detailed description to follow.

We accomplish the objects of our invention by the devices and means described in the following specification. The invention is clearly defined and pointed out in the claims.

A structure constituting a preferred embodiment of our invention is illustrated in the accompanying drawing forming a part of this specification, in which:

Figure I is a perspective view of the machine, the lower part of the supporting standard being broken away. Fig. II is a plan view taken looking in a direction at right angles to the top plate of the machine, the inclosing casing being removed to show the operating parts. Fig. III is a view in side elevation, the side casing being removed and a part of one of the side bars being broken away to show the operating rod and its connection. Fig. IV is a detail view taken partially in vertical section, showing the operating rod, the means for actuating the same and the connections at the upper end of said rod. Fig. V is a detail sectional view on the line 5—5 of Fig. II, some of the parts being shown in full lines, the position of the button feed finger and the actuating parts at the end of the button feeding movement being shown in dotted lines. Fig. VI is a view similar to Fig. V, showing, in full lines, the button feed finger raised and, in dotted lines, the button feed finger returned to its starting position at the end of the upward stroke of the operating rod. Fig. VII is an enlarged detail sectional view on the line 7—7 of Fig. V, showing in detail the mounting for the button feed finger slide and the cam means for raising and lowering the same. Fig. VIII is a perspective view of the actuating cam and the parts carried thereby, showing the connection of the same with the upper end of the operating rod. Fig. IX is an enlarged detail sectional view on the line 9—9 of Figs. III and V, showing in detail the mounting of the cam slide for raising the button feed finger and the means for actuating the same. Fig. X is an enlarged detail sectional view on the line 10—10 of Figs. III and V, showing the mounting of the upper cam block. Fig. XI is a perspective view of the cam slide for elevating the button feed finger slide. Fig. XII is a sectional view on the line 12—12 of Figs. II and XIX, showing the mounting of the button feed finger. Fig. XIII is a fragmentary view similar to Fig. II, showing the wire feeding mechanism at the end of the wire feeding movement. Fig. XIV is an enlarged detail sectional view on the line 14—14 of Figs. II and XIII, some of the parts being shown in full lines, showing the wire cutting knife and the cam for actuating the same, the parts being shown in full lines in their position at the beginning of the down stroke of the operating rod and the position of the parts at the end of the wire feeding movement being shown in dotted lines. Fig. XV is an enlarged detail fragmentary view similar to Fig. XIV, showing the position of the parts at the beginning of the wire cutting movement. Fig. XVI is a perspective view of the cams for actuating the wire feeding and wire cutting mechanism, and for actuating the staple forming and driving mechanism. Fig. XVII is a perspective view of the cams shown in Fig. XVI, taken from the opposite side thereof. Fig. XVIII is a perspective view of the wire cutting knife. Fig. XIX is an enlarged detail sectional view on the line 19—19 of Fig. II, showing in detail the staple forming, driving and clenching mechanism and the means for actuating the same, the parts being shown in their position at the beginning of the downward movement of the operating rod. Fig. XX is a fragmentary detail sectional view similar to Fig. XIX, showing a portion of the mechanism shown in Fig. XIX, the position of the parts at the end of the staple forming movement being shown. Fig. XXI is a view similar to Fig. XIX, showing the position of the parts at the ends of the staple driving and clenching movement, and at the end of the downward movement of the operating rod. Fig. XXII is a perspective view of the anvil. Fig. XXIII is an enlarged detail sectional view on the line 23—23 of Fig. XIII, showing the staple forming slide and the manner of mounting the same in the head block. Fig. XXIV is an enlarged detail sectional view on the line 24—24 of Figs. II, XIII, and XXIII, showing in detail the mounting of the bar carrying the staple forming block. Fig. XXV is a detail sectional view on the line 25—25 of Figs. II and XIII, showing in detail the rear end of the staple forming slide and the stop means for limiting the forward movement thereof. Fig. XXVI is a perspective view of the staple forming slide. Fig. XXVII is a perspective view of the bar carrying the staple forming block. Fig. XXVIII is a perspective view of the trip slide. Fig. XXIX is an enlarged detail sectional view on the line 29—29 of Fig. II, showing the details of the holder for the staple forming wire. Fig. XXX is an enlarged detail sectional view on the line 30—30 of Fig. I, showing the button chute in cross section. Fig. XXXI is a perspective view of the lower end of the button chute, showing the spring means for holding a button in place at the lower end of said chute. Fig. XXXII is a fragmentary detail sectional view showing the staple forming slide and block and the wire cutting knife, the button and the wire being shown in position at the beginning of the stroke of the operating rod. Fig. XXXIII is a view similar to Fig. XXXII, showing the parts in their position at the end of the wire feeding and button feeding movement, the button being shown in dotted lines. Fig. XXXIV is a view similar to Figs. XXXII and XXXIII, showing the parts at the end of the wire cutting movement. Fig. XXXV is a view similar to Figs. XXXII, XXXIII, and XXXIV, showing in detail the position of the staple forming slide and block and the anvil and the position of the button, the staple and the fabric at the end of the staple forming movement. Fig. XXXVI is a view similar to Fig. XXXV, showing the position of the parts, and of the button, the staple and the fabric at the completion of the movement when the button is finally attached to the fabric.

In the drawing, similar reference characters refer to similar parts throughout the several views, and the sectional views are taken looking in the direction of the little arrows at the ends of the section lines.

Considering the numbered parts of the drawing, the machine is carried upon side bars 1, 1, carried by and secured to the block 2 by means of the screws 3, 3. A head block 5 is secured to the forward ends of the side bars 1, 1, and a top plate 6 is supported from said head block 5, said top plate resting on a shoulder on the head block 5 and on the upper ends of posts 7 projecting from the head block 5 being secured thereto by means of screws 8, 8. The cover plate 11 is fastened to said head block and said top plate by means of the screws 12, 12. A block 13 having a channel on the under side thereof is secured to the cover plate 11 by means of the screws 14. An inclosing casing 15 connected by means of screws 16 to the side bars 1 and the cover plate 11 covers the operating parts at the rear end of the machine.

The block 2 is secured to the upper end of the tubular standard 17 by means of a set screw 18. The lower end of said standard 18 is secured in a base 19 by means of the set screws 20. A foot lever 21 provided with a pedal 22 is pivoted at 23 to an extension 24 from said base 19. Said foot lever 21 is provided with a notch 25 adapted to engage the forward edge of the base 19. A set screw 26 is provided extending upwardly from the base 19 and the lower edge of the foot lever 21 is adapted to contact with the head of the set screw 26 so as to limit the downward movement of the foot lever.

The operating rod 29 extends upwardly through the tubular standard 17 and a loop 27 is secured by means of a pin 30 to the lower end of said operating rod, said loop 27 embracing the foot lever 21 and being connected thereto by means of a pin 28 passing through said loop and said foot lever. A collar 32 is fixed to the operating rod 29 and a coiled spring 31 is disposed in the standard 17, being compressed between the collar 32 and a flange in the base 19, so that said spring 31 tends to return the operating rod 29 to its uppermost position.

A cam 33 provided with a forked rear end is pivotally connected to the upper end of the operating rod 29 by means of a pin 34 passing through said forked rear end and through the upper end of the operating rod 29. Said cam 33 is pivotally mounted on the side bars 1, 1, by means of a shaft 35 journaled in said side bars and passing through said cam, as clearly shown in Fig. IV. An arm 36 is secured to the side of the cam 33 by means of a screw 37, and said arm 36 carries at its forward end a pin 38 projecting laterally therefrom. The shaft 35 also passes through the arm 36. Collars or sleeves 35' are mounted upon said shaft 35 adjacent each of the side bars 1.

An arm 40 is pivoted at 41 to one of the side bars 1, and said arm 40 is provided with a cam slot 39 in which the pin 38 is disposed. The upper end of the arm 40 is provided with a slot 44 in which a pin 43 carried by the button feed finger slide 42 rides. The button feed finger 45 is provided at its forward end with a downturned portion 46 provided with a notch adapted to receive the head of a button. Said button feed finger is provided with a pair of downwardly projecting arms 47 pivotally mounted on a pin 48 which is carried by the button feed finger slide 42. A spring 49 is connected to the rear end of the button feed finger, the other end of said spring 49 being fixed to the slide 42. A plate 51 is fastened to the button feed finger slide 42 by means of the screws 52, and is provided at its lower edge with a laterally projecting flange 53 which is disposed in and slides in a groove 54 provided at the upper edge of the upper cam block 55 by means of which the button feed finger slide is raised and lowered.

A plate 57 is secured to the side of the head block 5 by means of the screws 58 and said plate is provided along its lower edge with a laterally projecting flange 59 as clearly shown in Fig. VII. The cam block 55 is provided at its ends with laterally directed flanges 56 engaging the ends of the plate 57 so as to be free to move transversely thereof. A lower cam block 60 is secured to and carried by the flange 59 of the plate 57. A screw threaded bolt 61 passes through a suitable opening 63 in the flange 59 and through a suitable opening in the lower cam block 60, then passes through a slot 71 provided in the cam slide 69 and the end of said bolt is threaded into a screw threaded socket provided in the lower edge of the upper cam block 55, as is clearly shown in Fig. VI. A spring 62 is disposed on said bolt and is compressed between the lower surface of the lower cam block 60 and the head of said bolt, the head of the bolt being disposed in a suitable opening 64 provided in the head block 5. Said spring 62 tends to draw the upper cam block 55 downwardly so as to hold it tightly in engagement with the cam slide 69 as clearly appears in Figs. V, VI and VII. The upper cam block 55 is provided on its lower edge with the forwardly inclined surfaces 74 and 66 and with the shoulder 65 to the rear of the foremost beveled surface 66. The lower cam block is provided on its upper edge with the forwardly inclined surfaces 75 and 68 corresponding to the surfaces 74 and 66 of the upper cam block and the lower cam block is provided with a shoulder 67 corresponding to the shoulder 65 of the upper cam block. The cam slide 69 is provided with a nose 70 having forwardly inclined surfaces corresponding to the surfaces 66 and 68 of the upper and lower cam block respectively, shoulders being provided at the rear of said nose 70 which are adapted to coact with the shoulders 65 and 67 of the upper and lower cam blocks respectively. Said cam slide is also provided with a tail 72 having forwardly inclined surfaces 74 and 75 respectively. The tail 72 of the cam slide is provided with a laterally directed arm 76 and a pin 77 projecting upwardly therefrom. The slide is also provided with an elongated slot 71 through which the bolt 61 passes. A notch 78 is provided in the lower edge of the button feed finger slide 42 receiving the pin 77 projecting upwardly from the cam slide 72. The forward end of said notch 78 is adapted to strike the pin 77 to move the cam slide rearwardly.

A block 80 is secured to the head block 5 by means of the bolt 81, said block 80 having a shoulder 82 at the rear thereof adapted to limit the rearward movement of the arm 40 and a shoulder 82' at the forward end to limit the forward movement of the arm 40. A plate 83' having a laterally projecting arm 83 is secured by means of the screws 84 to the side of the cam 105, as is clearly shown in Fig. XVII. The arm 83 is adapted to engage the laterally projecting arm 76 carried by the tail 72 of the cam slide so as to give a forward movement to the same. This is clearly shown in Figs. V, VI and IX. A plate 86 is secured to block 170 by means of the screws 87 and said plate 86 carries a stop 85 projecting upwardly at right angles thereto and adapted to engage the forward end of the button feed finger 45 so as to hold the same in elevated position at the end of the stroke against the tension of spring 49. A plate 88 is secured to the head block 5 by means of screws 89 and said plate 88 serves as a removable casing to cover the cam slide and the upper and lower cam blocks.

A boss 90 is secured to the top plate 6 by means of the bolt 91, and is provided with a pair of parallel ribs 92 projecting from the top thereof between which the arms 93 are pivoted at 94. Pins 95 are slidably mounted in sockets provided in the boss toward the center thereof, said pins being spring pressed outwardly by means of the springs 96, seated in said sockets. The ends of said pins engage the inner ends of the arms 93 as clearly shown in Fig. XXIX. Pins 97 are carried by the boss 90, said pins acting as stops to limit the downward movement of the arms 93. The spring pressed pins 95 act on the inner ends of the arms 93 so as to hold them in elevated position when they are lifted. The boss 90 acts as a holder for the coil of wire B from which the staples are formed, the arms 93 holding the coil of wire in place upon the boss. All this is clearly shown in Figs. I and II.

A cam 98 is secured to the cam 33 by means of the screw 98' and the shaft 35 which passes through the cam 98, the cam 33 and is journaled in the side bars 1, 1. Cam 98 is provided with a cam nose 99 which engages the cam surface 101 on the rear of the cam 100. Cam 100 is pivotally mounted on the rod 102 which is carried by the head block 5, the rod being held in place by means of the set screw 102', as is shown in Figs. I, II and III. A cam 105 is also pivotally mounted on the rod 102 and is disposed next to the cam 100, said cam 105 having secured thereto a laterally projecting pin 103 which is disposed in the elongated slot 104 provided in the cam 100. It will thus be seen that the cam 105 has a limited movement relative to cam 100. The upper forward end of the cam 105 has a laterally projecting pin 106 provided with square shoulders which pin engages in a notch 109 provided in a bell crank lever 107 pivotally mounted at 108 on the top plate 6. The bell crank lever 107 is provided with a straight edge 110 extending from the forward edge of the notch 109 to the forward edge of the bell crank lever. The other end of the bell crank lever 111 engages in the notch 112 provided in the wire feed lever 113 which is pivotally mounted on the top plate at 115. Said lever 113 carries at its forward end the under cut shoulder 114 which is adapted to receive the wire B from which the staples are formed. A pawl 116 is pivotally mounted at 117 on the lever 113, said pawl carrying a pin 119 projecting upwardly therefrom. A spring 118 is fixed to the pivot 117 and engages the pin 119 so as to hold the pawl yieldingly against the pin 121 which projects upwardly from the lever 113, the end of the pawl 116 being provided with teeth 120 in order to grip the wire more firmly. Pins 122 and 123 project upwardly from the top plate 6 to limit the movement of the feed lever 113.

A bar 124 is secured to the top plate 6 and has an under cut shoulder 125 at its outer edge which is similar to the shoulder 114 of the feed lever, said under cut shoulder receiving the wire B. The pawl 126 is pivotally mounted at 127 on the bar 124 and a pin 129, spring 128, and stop pin 131 are provided similar to the corresponding parts upon the lever 113. The extreme end of the pawl is also provided with teeth 130.

A notch or recess 132 is provided in the cam 100 below the pin 106 and a pin 133 projects laterally from said cam in the upper portion of said notch. A knife 134 is slidably mounted in the channel 137 in the head block 5, the tail of said knife being provided with a notch 135 in which the pin 133 on the cam 100 is disposed. The cutting edge of said knife at the forward end of the cutting head 134' is provided with a notch 136 to receive the wire B as it is cut. A block 139 is secured in place over the knife 134 by means of the screws 140 and the pin 141. The block 139 is provided with a recess 138 receiving the head 134' of the knife 134. A passage 142 is provided extending through the end of the block 139 at right angles to the knife 134 so as to permit the passage of the wire B therethrough and to hold the wire in place in front of the cutting edge of the knife.

The cam 33 is provided at its forward end with a cam nose 143, which engages the cam surfaces 144' and 144 on the cam 105. The anvil 147 is pivotally mounted at 148 on the bars 149 which are fixed to the under side of the head block 5. The rear end of the anvil is provided with a cam surface 146 adapted to be engaged by the finger 145 on the extreme forward lower end of the cam 105. A projecting shoulder 150 is secured to the anvil 147 by means of the screws 151. This shoulder 150 is adapted to be engaged by the shoulder 152 upon the forward lower end of the cam 105. The bracket 153 is secured to the anvil 147 slightly above the pivot point thereof by means of the screws 154. A curved shield and brace 155 is disposed between the anvil 157 and the bracket 153 and serves to prevent the fabric or leather to which the button is attached from catching between the anvil and the parts of the frame.

A pin 156 projects laterally from the upper end of the bracket 153 and engages in a notch 157 provided at the rear end of the slide 158 which is disposed in a channel 159 in the head block 5. The slide 158 has a channel 161 extending longitudinally thereof and a pair of oppositely disposed notches 160 are provided in said slide toward the center thereof.

The bar 162 is disposed in the channel 161 of the slide 158 and said bar 162 carries at its forward end the staple forming block 163. A pin 164 projecting from said bar 162 toward the rear end thereof is disposed in the slot 166 formed in the rear end of the staple forming slide 165, which has a channel 167 extending longitudinally thereof in which the upper edge of the bar 162 is disposed. A rib 168 is provided on each side of the staple forming slide 165 toward the top thereof and corresponding grooves are provided in the block 139 and in the block 170 which are secured to the head block 5 so that the slide 165 is supported by the blocks 139 and 170 being free to move longitudinally thereof. A pin 171 projects laterally from the rear end of the staple forming slide 165 and is adapted to engage the rear end of the block 139 so as to limit the forward movement of said slide. The staple forming slide has a longitudinally extending channel 174 which receives the shanks of the buttons A and the forward end of the slide is beveled at 172 and provided with notches 173 in which the wire B is disposed during the staple forming movement.

A pin 179 projects laterally from the side of the bar 162 toward the lower edge thereof, and said pin 179 is disposed in the curved slot 180 provided in the trip plate 181 which is pivotally mounted at 182 on the trip slide 158. Below the pivot point the trip plate is provided with a trip shoulder 183 which is disposed in the groove 184 formed in the plate 185 disposed in the bottom of the channel 159 in the head block. The bar 162 is provided at its rear end with a notch 162' which allows the forward end to swing upwardly when it is tilted. The lower rear end of the bar also has a beveled surface 164' for a purpose hereinafter to be described.

The cam 105 is provided at its forward upper end with a projecting nose 186 adapted to engage the rear end of the staple forming slide 165 and a bar 187 is secured to the cam 105 by means of the screw 188, the forward end of said bar being adapted to engage the beveled surface 164' at the rear end of the bar 162 to aid in tilting the same. The anvil 147 is provided at its extreme lower end with a cam surface 189 adapted to be engaged by the finger 145 of cam 105 at the end of the stroke of the operating rod. The extreme upper end of the anvil is provided with the anvil head 190 having the hardened steel clenching plate 191 secured therein, said plate being curved as at 192, as clearly shown in Figs. XXXV and XXXVI, so as to clench the staple which is driven against it.

175 is the button chute having a cross section of the shape shown in Figs. XXX and XXXI, the block 13 being provided with a channel 176 and the cover plate 11 being provided with a channel 177 to accommodate said button chute. A spring 178 is secured to the side of the button chute toward the lower end thereof and projects slightly over the end of the chute so as to yieldingly hold a button in place in the end thereof.

The buttons to be attached are indicated by the reference character A, the wire from which the staples are formed is indicated by the letter B and the fabric to which the buttons are to be attached is indicated by the letter C.

Having thus described the parts of the machine, we shall now proceed to describe the operation thereof. For convenience of description the operation of the machine may be divided into five movements, namely, the button feeding movement, the wire feeding movement, the wire cutting movement, the staple forming movement and the staple driving and clenching movement. The button feeding movement and the wire feeding movements are carried on simultaneously at the beginning of the downstroke of the operating rod. The wire cutting movement then takes place which is followed by the staple forming movement and the operation of the machine is concluded by the staple driving and clenching movement. However, although the button feeding movement is completed at the beginning of the down stroke of the operating rod, nevertheless during the remainder of the stroke the button feed finger is actuated to lift the same and to return it to starting position. All of the parts are operated by the downward movement of the operating rod 29 which is actuated by the depression of the foot lever 21 in a manner which will be clear from an inspection of Fig. IV of the drawing.

We will first consider the button feeding movement and the operation of the button feed finger. This movement is clearly shown in Figs. V and VI of the drawing. The full lines in Fig. V show the position of these parts at the beginning of the down stroke of the operating rod 29. The downward movement of the operating rod 29 causes the cam 33 which is connected to the upper end of said operating rod to rock upon the shaft 35. This cam 33 carries fixed thereto the arm 36 and as the cam 33 rocks the pin 38 on the end of the arm 36 rides in the curved slot 39. This causes the arm 40 to swing forward on its pivot 41 thus actuating the button feed finger slide 42 through the pin and slot connection at the top of the arm 40. The button feed finger 45 is held in an elevated position against the tension of the spring 49 by the stop 85. As the arm 40 is swung on its pivot 41, moving the button feed finger slide 42 forward, the button feed finger is moved off the stop 85 allowing it to swing downward into engagement with a button as is shown in Fig. XIX. As the button feed finger slide moves forward, the button is carried by the part 46 of the button feed finger 45 to a position adjacent the end of the staple forming slide 165 as appears in dotted lines in Fig. XXXIII. The dotted lines in Fig. V show the position of the parts at this stage of the operation. As the down stroke of the operating rod 29 is continued the nose 143 of the cam 33 engages the upper cam surface 144 of the cam 105 and tilts it forward upon its pivot 102 so that it brings the arm 83 of the plate 83′ into contact with the arm 76 projecting from the tail 72 of the cam slide 69. This forces the cam slide forward to the position shown in Fig. VI, the inclined surfaces of said slide moving on the inclined surfaces of the upper and lower cam blocks respectively, and thus lifting the upper cam block 55 against the tension of the spring 62 and lifting the button feed finger slide 42 which is carried by the upper cam block 55 so as to lift the button feed finger away from the button A which has been carried down to the end of the staple forming slide. This lifting of the button feed finger does not occur until after a wire has been put through the eye of the button so that it is held in place in the end of the staple forming slide. At the same time that the arm 83 is brought forward to force forward the cam slide the arm 40 is swung backward on its pivot somewhat due to the shape of the cam slot 39. This causes the button feed finger to move rearwardly a slight distance for a purpose which will be hereinafter described.

The full lines in Fig. VI show the position of the parts at the end of the down stroke of the operating rod. When the pressure is released from the foot lever 21 and the operating rod 29 moves upward under the influence of the spring 31 the arm 40 is swung rearwardly on its pivot 41 carrying with it the button feed finger slide 42. As this moves backward the shoulder 79 strikes the pin 77 moving it backward so as to give the cam slide a rearward impulse whereupon the spring 62 acting upon the upper cam block forces the cam slide rearwardly to the position shown in Fig. V, thus allowing the cam block 55 and button feed finger slide 42 to drop. This does not take place, however, until the bottom feed finger has moved over the stop 85 which holds the button feed finger in elevated position against the tension of the spring 49. The shoulders 65 and 67 of the upper and lower cam block limit the rearward movement of the cam slide 69. It will thus be seen that as the operating rod 29 is depressed the button feed finger slide is forced forwardly allowing the button feed finger to drop from the stop 85 and engage a button, then carrying the button forward to a position so that the eye thereof may receive the wire B. Arm 83 on the cam 105 then engages the tail of the cam slide to elevate the button feed finger slide and the button feed finger carried thereby so as to release the button, the button feed finger slide 42 moving rearwardly somewhat with the staple forming slide and upon the upstroke of the operating rod the button feed finger slide is carried rearwardly until the button feed finger engages the stop 85 and the shoulder 79 strikes the pin 77 to start the cam slide rearwardly and allow the button feed finger slide 42 to drop to its normal position under the influence of the spring 62.

The coil of wire B from which the staples are formed is kept on the wire holder 90, the wire being disposed in engagement with the under cut shoulders of the feed lever 113 and the bar 124. The pawls 126 and 116 on the bar 124 and the feed lever 113 respectively hold the wire in engagement with the undercut shoulders 125 and 114 respectively and allow the wire to be fed forwardly but prevent any rearward movement of the wire. The staple forming wire B is fed forwardly through passage 142 and through the eye of a button A which has been brought forward by the button feeding movement into position to receive it, by means of the feed arm 113. The cam 99 is secured to the cam 33, and as the operating rod 29 moves downwardly cam surface 99 engages the cam surface 101 of the cam 100 and swings it forwardly on its pivot 102. The pin 106 which is carried by the upper forward end of the cam 100 engages in the notch 109 of the bell crank lever 107 which is pivoted at 108 and swings the same forwardly as shown in Fig. XIII. The other end of the bell crank lever 111 engages the notch 112 in the feed lever 113 and as the bell crank lever is rocked on its pivot the feed lever 113 is caused to rock upon its pivot 115 from the position shown in Fig. II to the position shown in Fig. XIII. It will thus be seen that the wire B which is carried by the feed arm is fed forwardly through the eye of the button which is brought down to receive it as is shown in Fig. XXXIII.

As will be seen most clearly by an inspection of Figs. XXXII to XXXVI inclusive, the wire B is fed forward by the wire feeding mechanism through a passage 142 in the block 139. The wire cutting knife 134 is slidably mounted in the channel 137 provided in the head block 5 and the tail of the knife has a notch 135 in which a pin 133 carried by the cam 100 is disposed. As the operating rod 29 moves downward the cam 99 being secured to the cam 33 rocks with the latter on the shaft 35 and the cam surface 99 engages the cam surface 101 of the cam 100 thereby rocking the same forward on its pivot 102 and causing the pin 133 to strike against the shoulder at the forward end of the notch 135 moving the knife forwardly in the channel 137 in the block 5 and forcing the cutting edge thereof against the wire C as clearly shown in Figs. XXXIII and XXXIV of the drawing. As the cam 100 moves back to its normal position on the upstroke of the operating rod the pin 133 engages the shoulder at the rear end of the notch 135 and returns the wire cutting knife to its normal position.

The parts which form the staple and drive and clench the same and the mechanism for operating these parts are most clearly shown in Figs. XIX to XXII, inclusive. Considering these figures it will be seen that as the operating rod 29 descends it rocks the cam 33 upon the shaft 35 causing the nose 143 of the cam 33 to engage the cam surface 144 of the cam 105, thus rocking said cam upon its pivot 102. This causes the finger 145 at the lower forward edge of the cam to engage the cam surface 146 of the anvil 147 to rock the latter upon its pivot 148. This causes the head 190 of the anvil to approach the staple forming die and the anvil in its rocking movement carries the bracket 153 with the pin 156 inwardly. The pin 156 engages in the slot 157 in the slide 158, and as the anvil is rocked trip slide 158 is moved inwardly. The pin 179 on the bar 162 rests in the notches 160 of the slide 159 so that as the slide 158 is moved rearwardly it carries the staple forming block with it moving the latter to position shown in Figs. XX and XXXV. As the slide 158 is moved rearwardly through the engagement of the pin 156 in the notch 157 the staple forming block 163 is moved up until it engages the wire which is held in the eye of the button at the end of the staple forming slide 165 and the continued rearward movement of the slide 158 causes the staple forming block 163 to press against the end of the staple forming slide 165 and force the same rearwardly a short distance, the ribs 168 on said staple forming slide sliding in the grooves 169 in the blocks 139 and 170 respectively. These grooves in the blocks 139 and 170 are so located relative to the top of the block that the wire as it is formed into a staple lies in these grooves as is clearly shown in Figs. XXXV and XXXVI. It will thus be seen that as the staple forming block 163 is forced backward carrying with it the staple forming slide 165, the wire held between the block and the end of the slide is bent around the block into the form of a staple by its engagement with the grooves 169 in the blocks 139 and 170. This is clearly shown in Fig. XXXV. When the slide 158 has moved rearwardly sufficiently to form the staple, trip shoulder 183 depending from the trip plate 181 into the groove 184 engages the rear end of the said groove to trip the plate on its pivot 182 so as to remove the shoulder at the upper end of the curved slot from beneath the pin 179 on the bar 162. At the same time the end of arm 187 carried by the cam 105 engages the beveled surface 164' at the rear end of bar 162 and tilts the latter upon its pivot 179 so as to cause the staple forming block 163 to drop below the end of the staple forming slide, as clearly shown in Fig. XXI. The notch 162' is provided in the upper edge of the bar 162 so as to permit the rear end thereof to swing by the rear end of the staple forming slide 165. As the operating rod 29 continues to move downwardly the finger 145 engages the cam surface 189 at the inner end of the anvil so as to rock the same on its pivot slightly to move and hold it securely in position at the end of the staple forming slide, and, at the same time, the nose 186 of cam 105 comes into engagement with the rear end of the staple forming slide 165 and forces it forwardly pushing the formed staple ahead of it so as to force it through the fabric C and against the clenching plate 191 in the anvil head 190 driving the staple through the fabric and clenching it securely, as shown in Fig. XXXVI.

As clearly appears, upon the downstroke of the operating rod 29 the anvil is first moved up into proximity to the staple forming block 163, the latter is moved inwardly to engage the end of the staple forming slide gripping the wire which has been cut off between the end of the slide and the face of the block, the block then moves rearwardly carrying the staple forming slide with it and forming the staple by forcing the ends of the wire against the sides of the grooves 169 in the blocks 139 and 170, respectively. Then when the staple forming slide and block have been moved rearwardly far enough to form the staple, the trip plate is released and the bar 162 is tilted so as to lower the staple forming block 163 and, at the same time, the nose 186 moves forwardly against the rear end of the staple forming slide 165 forcing the slide and the staple in front of it, driving the staple through the fabric and clenching it against the clenching plate 191.

It will be seen that after the block engages the end of the staple forming slide the two are moved rearwardly a short distance. At the same time that this movement takes place, the button feed finger 46 is moved rearwardly a short distance due to the curvature of the upper end of the slot 39 in the arm 40, as has been previously pointed out.

On the upward movement of the operating rod 29 the cam nose 143 engages the cam surface 144' and swings the cam 105 on its pivot 102. This causes the shoulder 152 to engage the shoulder 150 secured to the anvil and rocks the anvil on its pivot away from the end of the staple forming slide carrying the slide 158 forwardly and, at the same time, tilting the bar 162 to its normal position and causing the pin 179 to engage upon the shoulder at the upper end of the slot 180 in the trip plate 181, so that at the end of the upward movement of the operating rod the parts are returned to their normal position as shown in Fig. XIX.

Figs. XXXII to XXXVI show the position of the button A, the wire B and the fabric C at various stages of the operation of the machine. Fig. XXXII shows them in the starting position. In Fig. XXXIII the wire B has been fed by the wire feeding mechanism through the eye of a button A which has been brought down to the end of the staple forming slide by means of the button feeding mechanism. In Fig. XXXIV the knife 134 has moved forward to cut the wire which has been fed into position. In Fig. XXXV the staple forming block 163 has moved rearwardly and forced the staple forming slide and the button carried thereby rearwardly bringing the ends of the wire into engagement with the grooves 169 in the blocks 139 and 170 and forming the staple. In Fig. XXXV the fabric C is shown in position in front of the clenching plate 191 of the anvil head. In Fig. XXXVI the movement is shown completed, the staple forming slide having been forced forward so as to drive the staple through the fabric C and the ends of the staple having been clenched against the curved surface 192 of the plate 191.

Buttons are fed to the machine by the chute 175 which extends beneath the block 13 and terminates adjacent the rear end of the staple forming slide 165. This chute is shown in cross section in Fig. XXX and the buttons are arranged therein with the shank or eye depending into the lower portion of the chute. As appears in Figs. XIX and XX toward the lower end of the chute this lower narrowed portion is broken away so that the buttons are supported with the eyes depending beneath the chute. As the buttons come downward, the eyes of the button depend into the channel 174 at the top of the staple forming slide 165. A spring 178 is attached to the side of the chute 175 and holds the lowermost button in position until it is engaged by the button feed finger 45 to carry it into position to receive the wire which is fed through it.

In this application we have illustrated and described the operating rod 29 as actuated by the depression of a foot lever 21. It will be apparent, however, that other means of applying power may be used and that any mechanism by means of which a reciprocatory motion is given to the operating rod 29 may be substituted for the foot lever and the operating parts which we have here shown. We therefore do not wish to be restricted to the actuation of the operating rod 29 by means of a foot lever as we contemplate the use of any means which imparts a reciprocatory motion to the rod.

We are aware that this particular structure, which we have here shown and described, is susceptible of considerable variation without departing from the spirit of our invention, and, therefore, we do not wish to be restricted to the same. We have found, however, that this particular form is to be preferred, and therefore we desire to claim the same specifically as well as broadly as indicated by our appended claims.

Having thus described our invention, what we claim as new and desire to secure by Letters Patent is:

1. In a machine of the class described, the combination of a frame comprising a pair of side bars and a head block supported thereon, said head block being provided with a channel, the bottom of said channel being provided with a groove, a pair of guide blocks secured to the top of said head block with the inner edges thereof adjacent the sides of said channel, said guide blocks being provided with longitudinally extending grooves on their inner edges, a staple forming slide provided with ribs on the side thereof, said ribs being disposed in the grooves of said guide blocks whereby said slide is slidably carried by said guide blocks, said staple forming slide being provided with a longitudinally extending channel in the upper part thereof adapted to receive the shank of the button to be attached, and a longitudinally extending channel in the lower part thereof, the rear end of said slide being provided with oppositely disposed longitudinally extending notches and with a laterally projecting stop pin adapted to engage the rear end of one of said guide blocks, a trip slide disposed in said channel in said head block and provided with a longitudinally extending channel and with oppositely disposed vertical notches therein, a bar disposed in the channel of said trip slide, a staple forming block on said bar, a trip pin projecting laterally from said bar and disposed in the vertical notches of said trip slide, a second pin projecting from said bar and disposed in the notches at the rear end of said staple forming slide, a trip plate pivoted to the side of said trip slide, said trip plate being provided with a curved slot in which said trip pin is disposed, and a shoulder depending from said trip plate into the groove at the bottom of the channel in said head block, an anvil mounted on said frame and provided at its outer end with an anvil head, a laterally projecting bracket carried by said anvil and provided with a pin, said trip slide having a notch in its forward end, in which said pin is disposed whereby as said anvil is rocked on its pivot said slide is reciprocated, a cam pivotally mounted on said frame and having a nose adapted to engage the rear end of the staple forming slide and a finger adapted to engage a cam surface on said anvil whereby said anvil is rocked on its pivot, an arm carried by said cam and adapted to engage the rear end of said bar to tilt the same, and means for rocking said cam upon its pivot, all coacting substantially as described for the purpose specified.

2. In a machine of the class described, the combination of a frame comprising a pair of side bars and a head block supported thereon, said head block being provided with a channel, the bottom of said channel being provided with a groove, a staple, forming slide slidably mounted on said head block, said staple forming slide being provided with a longitudinally extending channel in the upper part thereof adapted to receive the shank of the button to be attached, and a longitudinally extending channel in the lower part thereof, the rear end of said slide being provided with oppositely disposed longitudinally extending notches and with a laterally projecting stop pin, a trip slide disposed in said channel in said head block and provided with a longitudinally extending channel and with oppositely disposed vertical notches therein, a bar disposed in the channel of said trip slide, a staple forming block on said bar, a trip pin projecting laterally from said bar and disposed in the vertical notches of said trip slide, a second pin projecting from said bar and disposed in the notches at the rear end of said staple forming slide, a trip plate pivoted to the side of said trip slide, said trip plate being provided with a curved slot in which said trip pin is disposed, and a shoulder depending from said trip plate into the groove at the bottom of the channel in said head block, an anvil pivotally mounted on said frame and provided at its outer end with an anvil head, a laterally projecting bracket carried by said anvil and provided with a pin, said trip slide having a notch in its forward end, in which said pin is disposed whereby as said anvil is rocked on its pivot said slide is reciprocated, a cam pivotally mounted on said frame and having a nose adapted to engage the rear end of the staple forming slide and a finger adapted to engage a cam surface on said anvil whereby said anvil is rocked on its pivot, an arm carried by said cam and adapted to engage the rear end of said bar to tilt the same, and means for rocking said cam upon its pivot, all coacting substantially as described for the purpose specified.

3. In a machine of the class described, the combination of a frame comprising a pair of side bars and a head block supported thereon, said head block being provided with a channel, the bottom of said channel being provided with a groove, a staple forming slide slidably mounted on said head block, said staple forming slide being provided with a longitudinally extending channel in the lower part thereof, the rear end of said slide being provided with oppositely disposed longitudinally extending notches and with a laterally projecting stop pin, a trip slide disposed in said channel in said head block and provided with a longitudinally extending channel and with oppositely disposed vertical notches therein, a bar disposed in the channel of said trip slide, a staple forming block on said bar, a trip pin projecting laterally from said bar and disposed in the vertical notches of said trip slide, a second pin projecting from said bar and disposed in the notches at the rear end of said staple forming slide, a trip plate pivoted to the side of said trip slide, said trip plate being provided with a curved slot in which said trip pin is disposed, and a shoulder depending from said trip plate into the groove at the bottom of the channel in said head block, an anvil pivotally mounted on said frame and provided at its outer end with an anvil head, a laterally projecting bracket carried by said anvil and provided with a pin, said trip slide having a notch in its forward end, in which said pin is disposed whereby as said anvil is rocked on its pivot said slide is reciprocated, a cam pivotally mounted on said frame and having a nose adapted to engage the rear end of the staple forming slide and a finger adapted to engage a cam surface on said anvil whereby said anvil is rocked on its pivot, an arm carried by said cam and adapted to engage the rear end of said bar to tilt the same, and means for rocking said cam upon its pivot, all coacting substantially as described for the purpose specified.

4. In a machine of the class described, the combination of a frame comprising a pair of side bars and a head block supported thereon, said head block being provided with a channel, the bottom of said channel being provided with a groove, a staple forming slide slidably mounted on said head block, the rear end of said slide being provided with oppositely disposed longitudinally extending notches, a trip slide disposed in said channel and provided with a longitudinally extending channel and with oppositely disposed vertical notches therein, a bar disposed in the channel of said trip slide, a staple forming block on said bar, a trip pin projecting laterally from said bar and disposed in the vertical notches of said trip slide, a second pin projecting from said bar and disposed in the notches at the rear end of said staple forming slide, a trip plate pivoted to the side of said trip slide, said trip plate being provided with a curved slot in which said trip pin is disposed, and a shoulder depending from said trip plate into the groove at the bottom of the channel in said head block, an anvil pivotally mounted on said frame and provided at its outer end with an anvil head, a laterally projecting bracket carried by said anvil and provided with a pin, a notch in the forward end of said trip slide in which said pin is disposed whereby as said anvil is rocked on its pivot said slide is reciprocated, a cam pivotally mounted on said frame and having a nose adapted to engage the rear end of the staple forming slide and a finger adapted to engage a cam surface on said anvil whereby said anvil is rocked on its pivot, an arm carried by said cam and adapted to engage the rear end of said bar to tilt the same, and means for rocking said cam upon its pivot, all coacting substantially as described for the purpose specified.

5. In a machine of the class described, the combination of a frame comprising a pair of side bars and a head block supported thereon, said head block being provided with a channel, the bottom of said channel being provided with a groove, a staple forming slide slidably mounted on said head block, the rear end of said slide being provided with oppositely disposed longitudinally extending notches, a trip slide disposed in said channel and provided with a longitudinally extending channel and with oppositely disposed vertical notches therein, a bar disposed in the channel of said trip slide, a staple forming block on said bar, a trip pin projecting laterally from said bar and disposed in the vertical notches of said trip slide, a second pin projecting from said bar and disposed in the notches at the rear end of said staple forming slide, a trip plate pivoted to the side of said trip slide, said trip plate being provided with a curved slot in which said trip pin is disposed, and a shoulder depending from said trip plate into the groove at the bottom of the channel in said head block, an anvil pivotally mounted on said frame and provided at its outer end with an anvil head, a laterally projecting bracket carried by said anvil and provided with a pin, said trip slide having a notch in its forward end, in which said pin is disposed whereby as said anvil is rocked on its pivot said slide is reciprocated, a cam pivotally mounted on said frame and having a nose adapted to engage the rear end of the staple forming slide and a finger adapted to engage a cam surface on said anvil whereby said anvil is rocked on its pivot, an arm carried by said cam and adapted to engage the rear end of said bar to tilt the same, and means for rocking said cam upon its pivot, all coacting substantially as described for the purpose specified.

6. In a machine of the class described, the combination of a frame comprising a pair of side bars and a head block supported thereupon, said head block being provided with a channel, the bottom of said channel being provided with a groove, a staple forming slide slidably mounted on said head block, the rear end of said slide being provided with oppositely disposed longitudinally extending notches, a trip slide disposed in said channel and provided with oppositely disposed vertical notches therein, a bar, a staple forming block on said bar, a trip pin projecting laterally from said bar and disposed in the vertical notches of said trip slide, a second pin projecting from said bar and disposed in the notches at the rear end of said staple forming slide, a trip plate pivoted to the side of said trip slide, said trip slide being provided with a curved slot in which said trip pin is disposed, and a shoulder depending from said trip plate into the groove at the bottom of the channel in said head block, an anvil pivotally mounted on said frame and provided at its outer end with an anvil head, a laterally projecting bracket carried by said anvil and provided with a pin, said trip slide having a notch in the forward end of said trip slide in which said pin is disposed whereby as said anvil is rocked on its pivot said slide is reciprocated, a cam pivotally mounted on said frame and having a nose adapted to engage the rear end of the staple forming slide and a finger adapted to engage a cam surface on said anvil whereby said anvil is rocked on its pivot, an arm carried by said cam and adapted to engage the rear end of said bar to tilt the same, and means for rocking said cam upon its pivot, all coacting substantially as described for its purpose specified.

7. In a machine of the class described, the combination of a frame comprising a pair of side bars and a head block supported thereon, said head block being provided with a channel, the bottom of said channel being provided with a groove, a staple forming slide slidably mounted on said head block, the rear end of said slide being provided with oppositely disposed longitudinally extending notches, a trip slide disposed in said channel and provided with oppositely disposed vertical notches therein, a bar, a staple forming block on said bar, a trip pin projecting laterally from said bar and disposed in the vertical notches of said trip slide, a second pin projecting from said bar and disposed in the notches at the rear end of said staple forming slide, a trip plate pivoted to the side of said trip slide, said trip plate being provided with a curved slot in which said trip pin is disposed, and a shoulder depending from said trip plate into the groove at the bottom of the channel in said head block, an anvil pivotally mounted on said frame and provided at its outer end with an anvil head, a laterally projecting bracket carried by said anvil and provided with a pin, said trip slide having a notch in its forward end, in which said pin is disposed whereby as said anvil is rocked on its pivot said slide is reciprocated, a cam pivotally mounted on said frame and having a nose adapted to engage the rear end of the staple forming slide and a finger adapted to engage a cam surface on said anvil whereby said anvil is rocked on its pivot, and means for rocking said cam upon its pivot, all coacting substantially as described for the purpose specified.

8. In a machine of the class described, the combination of a frame comprising a pair of side bars and a head block supported thereon, said head block being provided with a channel, the bottom of said channel being provided with a groove, a staple forming slide slidably mounted on said head block, the rear end of said slide being provided with a longitudinally extending notch, a trip slide disposed in said channel and provided with a vertical notch therein, a bar, a staple forming block on said bar, a trip pin projecting laterally from said bar and disposed in the vertical notch in said trip slide, a second pin projecting from said bar and disposed in the notch in the rear end of said staple forming slide, a trip plate pivoted to the side of said trip slide, said trip plate being provided with a curved slot in which said trip pin is disposed and a shoulder depending from said trip plate into the groove in the bottom of the channel in said head block, an anvil pivotally mounted on said frame and provided at its outer end with an anvil head, a laterally projecting bracket carried by said anvil and provided with a pin, said trip slide having a notch in its forward end, in which said pin is disposed whereby when said anvil is rocked on its pivot said slide is reciprocated, a cam pivotally mounted on said frame and having a nose adapted to engage the rear end of the staple forming slide, and a finger adapted to engage a cam surface on said anvil whereby said anvil is rocked on its pivot, and means for rocking said cam upon its pivot, all coacting substantially as described for the purpose specified.

9. In a machine of the class described, the combination of a frame comprising a pair of side bars and a head block supported thereon, a staple forming slide slidably mounted on said head block, the rear end of said slide being provided with a longitudinally extending notch, a trip slide provided with a vertical notch, a bar, a staple forming block on said bar, a trip pin projecting laterally from said bar and disposed in the vertical notch in said trip slide, a second pin projecting from said bar and disposed in the notch at the rear end of said staple forming slide, a trip plate carried by said trip slide and supporting said trip pin, means whereby, as said slide is reciprocated, said plate is tripped to release the trip pin, an anvil pivotally mounted on said frame and provided at its outer end with an anvil head, a laterally projecting bracket carried by said anvil and provided with a pin, said trip slide having a notch in its forward end, in which said pin is disposed whereby, as said anvil is rocked on its pivot, said slide is reciprocated, a cam pivotally mounted on said frame and having a nose adapted to engage the rear end of the staple forming slide, and a finger adapted to engage a cam surface on said anvil whereby said anvil is rocked on its pivot, and means for rocking said cam upon its pivot, all coacting substantially as described for the purpose specified.

10. In a machine of the class described, the combination of a frame comprising a pair of side bars and a head block supported thereon, a staple forming slide slidably mounted on said head block, the rear of said slide being provided with a longitudinally extending notch, a trip slide provided with a vertical notch, a bar, a staple forming block on said bar, a trip pin projecting laterally from said bar and disposed in the vertical notch of said trip slide, a second pin projecting from said bar and disposed in the notch in the rear end of said staple forming slide, a trip plate carried by said trip slide and supporting said trip pin, means whereby, as said trip slide is reciprocated, said plate is tripped to release the trip pin, an anvil pivotally mounted on said frame and provided on its outer end with an anvil head, a connection between said anvil and said trip slide whereby, as said anvil is rocked on its pivot, said slide is reciprocated, a cam pivotally mounted on said frame and having a nose adapted to engage the rear end of the staple forming slide, and a finger adapted to engage a cam surface on said anvil whereby said anvil is rocked on its pivot, and means for rocking said cam upon its pivot, all coacting substantially as described for the purpose specified.

11. In a machine of the class described, the combination of a frame comprising a pair of side bars with a head block supported thereon, a staple forming slide slidably mounted on said head block, a bar, a staple forming block on said bar, the rear end of said bar being pivotally mounted on said staple forming slide and slidable relative thereto, a trip slide engaging said bar to reciprocate the same, means carried by said trip slide and supporting the forward end of said bar with said staple forming block in line with the end of said staple forming slide, means for tripping said supporting means whereby said staple forming block is dropped beneath the end of the staple forming slide, an anvil pivotally mounted on the frame and provided on its outer end with an anvil head in line with the end of said staple forming slide, a connection between said anvil and said trip slide whereby, as said anvil is rocked on its pivot, said trip slide is reciprocated, a cam pivotally mounted on said frame and having a nose adapted to engage the rear end of the staple forming slide, and a finger adapted to engage a cam surface on said anvil whereby said anvil is rocked on its pivot, and means for rocking said cam upon its pivot, all coacting substantially as described for the purpose specified.

12. In a machine of the class described, the combination of a frame comprising a pair of side bars, and a head block supported thereon, a staple forming slide, a trip slide, a bar carried by said staple forming slide and said trip slide, a staple forming block on said bar, an anvil pivotally mounted on said frame and connected with said trip slide whereby, when said anvil is rocked on its pivot, said staple forming slide is reciprocated to form the staple, and means for rocking said anvil on its pivot, all coacting substantially as described for the purpose specified.

13. In a machine of the class described, the combination of a frame comprising a pair of side bars and a head block supported thereon, a staple forming slide, a bar, a staple forming block on said bar, an anvil pivotally mounted on said frame, means for rocking said anvil on its pivot, connections from said anvil to said bar whereby, when said anvil is rocked on its pivot, said bar and staple forming slide are reciprocated to form the staple, and means for tilting said bar whereby said block is dropped beneath the end of said staple forming slide, all coacting substantially as described for the purpose specified.

14. In a machine of the class described, the combination of a frame comprising a pair of side bars and a head block supported thereon, a staple forming slide, a bar, a staple forming block on said bar, an anvil pivotally mounted on said frame, means for rocking said anvil on its pivot, connections from said anvil to said bar whereby, when said anvil is rocked on its pivot, said bar and staple forming slide are reciprocated to form the staple, and means whereby said block is dropped beneath the end of said staple forming slide, all coacting substantially as described for the purpose specified.

15. In a machine of the class described, the combination of a head block, a staple forming slide, a staple forming block, an anvil, means for moving said anvil toward said staple forming block, and connections from said anvil to said block whereby, as said anvil is moved toward said block, said block and slide are reciprocated to form the staple, all coacting substantially as described for the purpose specified.

16. In a machine of the class described, the combination of a frame comprising a pair of side bars and a head block supported thereon, staple forming and driving mechanism, a guide plate secured to the side of said head block and provided with a laterally projecting flange at its lower end, a lower cam block fixed to said flange, an upper cam block provided with laterally directed flanges at each end thereof embracing the sides of said guide plate, said cam blocks being provided on adjacent edges with complementary shoulders the rear sides of which are forwardly inclined, a cam slide disposed between said upper and lower cam blocks and provided with portions connected by a narrow shank and having their forward sides forwardly inclined, a pin passing through the flange of said guide plate and through said lower cam block, and screw threaded into said upper cam block, said cam slide being provided with an elongated slot through which said pin passes, a spring disposed on said pin between the head thereof and the lower surface of said lower cam block, an upwardly projecting pin on the rear of said cam slide, an arm projecting laterally from the rear of said cam slide, said upper cam block being provided with a longitudinally extending groove, a button feed finger slide having a flange disposed in the groove of said upper cam block and having a notch in its lower edge the forward end of which is adapted to strike the pin on said cam slide, a button feed finger pivotally mounted on the forward end of said button feed finger slide, a spring tending to force the end of said finger downwardly, a stop secured on said head block and adapted to engage said finger to hold it in elevated position, an arm pivotally mounted on one of said side bars and having a pin and slot connection with said button feed finger slide, a cam slot in said arm, an actuating cam pivotally mounted on the frame, an arm secured to said cam having a laterally projecting pin engaging in said cam slot, a staple forming and driving cam pivotally mounted on said frame and adapted to be engaged and actuated by said actuating cam, an arm carried by said staple forming and driving cam and adapted to engage the laterally projecting arm of the cam slide, and an operating rod pivotally connected to the rear end of said actuating cam, all coacting substantially as described for the purpose specified.

17. In a machine of the class described, the combination of a frame comprising a pair of side bars and a head block supported thereon, staple forming and driving mechanism, a guide plate secured to the side of said head block, a lower cam block fixed to said guide plate, an upper cam block provided with laterally directed flanges at each end thereof embracing the sides of said guide plate, said cam blocks being provided on adjacent edges with complementary shoulders the rear sides of which are forwardly inclined, a cam slide disposed between said upper and lower cam blocks and provided with portions connected by a narrow shank and having their forward sides forwardly inclined, a pin passing through said lower cam block said cam slide being provided with an elongated slot through which said pin passes, a spring disposed on said pin between the head thereof and the lower surface of said lower cam block, an upwardly projecting pin on the rear of said cam slide, an arm projecting laterally from the rear of said cam slide, said upper cam block being provided with a longitudinally extending groove, a button feed finger slide having a flange disposed in the groove of said upper cam block and having a notch in its lower edge the forward end of which is adapted to strike the pin on said cam slide, a button feed finger pivotally mounted on the forward end of said button feed finger slide, a spring tending to force the end of said finger downwardly, a stop carried by said head block and adapted to engage said finger to hold it in elevated position, an arm pivotally mounted on one of said side bars and having a pin and slot connection with said button feed finger slide, a cam slot in said arm, an actuating cam pivotally mounted on the frame, an arm secured to said cam having a laterally projecting pin engaging in said cam slot, a staple forming and driving cam pivotally mounted on said frame and adapted to be engaged and actuated by said actuating cam, an arm carried by said staple forming and driving cam and adapted to engage the laterally projecting arm of the cam slide, and an operating rod pivotally connected to the rear end of said actuating cam, all coacting substantially as described for the purpose specified.

18. In a machine of the class described, the combination of a frame comprising a pair of side bars and a head block supported thereon, staple forming and driving mechanism, a guide plate secured to the side of said head block, a lower cam block fixed to said guide plate, an upper cam block provided with laterally directed flanges at each end thereof embracing the sides of said guide plate, said cam blocks being provided on adjacent edges with complementary shoulders, the rear sides of which are forwardly inclined, a cam slide disposed between said upper and lower cam blocks and provided with portions connected by a narrow shank and having their forward sides forwardly inclined, spring means tending to move said upper and lower cam blocks toward each other, an upwardly projecting pin on the rear of said cam slide, an arm projecting laterally from the rear of said cam slide, said upper cam block being provided with a longitudinally extending groove, a button feed finger slide having a flange disposed in the groove of said upper cam block and having a notch in its lower edge the forward end of which is adapted to strike the pin on said cam slide, a button feed finger pivotally mounted on the forward end of said button feed finger slide, a spring tending to force the end of said finger downwardly, a stop carried by said head block and adapted to engage said finger and hold it in elevated position, an arm pivotally mounted on one of said side bars and having a pin and slot connection with said button feed finger slide, a cam slot in said arm, an actuating cam pivotally mounted on the frame, an arm secured to said cam having a laterally projecting pin engaging in said cam slot, a staple forming and driving cam pivotally mounted on said frame and adapted to be engaged and actuated by said actuating cam, an arm carried by said staple forming and driving cam and adapted to engage the laterally projecting arm of the slide, and an operating rod pivotally connected to the rear end of said actuating cam, all coacting substantially as described for the purpose specified.

19. In a machine of the class described, the combination of a frame comprising a pair of side bars and a head block supported thereon, staple forming and driving mechanisms, a lower cam block fixed to said head block, an upper cam block slidably mounted on said head block so as to slide transversely thereof, said cam blocks being provided on adjacent edges with complementary shoulders the rear sides of which are forwardly inclined, a cam slide disposed between said upper and lower cam blocks and provided with portions connected by a narrow shank and having their forward sides inclined, spring means tending to move said upper and lower cam blocks toward each other, an upwardly projecting pin on the rear of said cam slide, an arm projecting laterally from the rear of said cam slide, said upper cam block being provided with a longitudinally extending groove, a button feed finger slide having a flange disposed in the groove of said upper cam block and having a notch in its lower edge, the forward end of which is adapted to strike the pin on said cam slide, a button feed finger pivotally mounted on the forward end of said button feed finger slide, a spring tending to force the end of said finger downwardly, a stop carried by said head block and adapted to engage said finger to hold it in elevated position, an arm pivotally mounted on one of said side bars and having a pin and slot connection with said button feed finger slide, a cam slot in said arm, an actuating cam pivotally mounted on said frame, an arm secured to said cam having a laterally projecting pin engaging in said cam slot, a staple forming and driving cam pivotally mounted on said frame and adapted to be engaged and actuated by said actuating cam, an arm carried by said staple forming and driving cam and adapted to engage the laterally projecting arm on the cam slide, and an operating rod pivotally connected to the rear end of said actuating cam, all coacting substantially as described for the purpose specified.

20. In a machine of the class described, the combination of a frame comprising a pair of side bars and a head block supported thereon, staple forming and driving mechanism, a lower cam block secured to said head block, an upper cam block slidably mounted on said head block so as to slide transversely thereof, said cam blocks being provided with complementary shoulders the rear sides of which are forwardly inclined, a cam slide disposed between said upper and lower cam block and provided with forwardly inclined surfaces adapted to coact with the forwardly inclined surfaces of said cam blocks, spring means tending to move said upper and lower cam blocks toward each other, an upwardly projecting pin on the rear of said cam slide, an arm projecting laterally from the rear of said cam slide, said upper cam block being provided with a longitudinally extending groove, a button feed finger slide having a flange disposed in the groove of said upper cam block and having a notch in its lower edge the forward end of which is adapted to strike the pin on said cam slide, a button feed finger pivotally mounted on the forward end of said button feed finger slide, a spring tending to force the end of said finger downwardly, a stop carried by said head block and adapted to engage said finger to hold it in elevated position, an arm pivotally mounted on one of said side bars and having a pin and slot connection with said button feed finger slide, a cam slot in said arm, an actuating cam pivotally mounted on the frame, an arm secured to said cam and having a laterally projecting pin engaging in said cam slot, a staple forming and driving cam pivotally mounted on said frame and adapted to engage and be actuated by said actuating cam, an arm carried by said staple forming and driving cam and adapted to engage the laterally projecting arm of the cam slide, and an operating rod pivotally connected to the rear end of said actuating cam, all coacting substantially as described for the purpose specified.

21. In a machine of the class described, the combination of a frame comprising a pair of side bars and a head block supported thereon, staple forming and driving mechanism, a lower cam block secured to said head block, an upper cam block slidably mounted on said head block so as to slide transversely thereof, said cam blocks being provided on adjacent edges with complementary shoulders, and rear sides of which are forwardly inclined, a cam slide disposed between said upper and lower cam blocks and provided with forwardly inclined surfaces coacting with said forwardly inclined surfaces of the cam blocks, spring means tending to move said upper and lower cam blocks toward each other, an upwardly projecting pin on the rear of said cam slide, an arm projecting laterally from the rear of said cam slide, a button feed finger slide slidably mounted on said upper cam block and having a notch in its lower edge the forward end of which is adapted to strike the pin on said cam slide, a button feed finger pivotally mounted on the forward end of said button feed finger slide, an arm pivotally mounted on one of said side bars and having a pin and slot connection with said button feed finger slide, a cam slot in said arm, an actuating cam pivotally mounted on the frame, an arm secured to said cam having a laterally projecting pin engaging in said cam slot, a staple forming and driving cam pivotally mounted on said frame and adapted to be engaged and actuated by said actuating cam, an arm carried by said staple forming and driving cam and adapted to engage the laterally projecting arm of the cam slide, and an operating rod pivotally connected to the rear end of said actuating cam, all coacting substantially as described for the purpose specified.

22. In a machine of the class described, the combination of a frame comprising a pair of side bars and a head block supported thereon, staple forming and driving mechanism, a lower cam block secured to said head block, an upper cam block slidably mounted on said head block so as to slide transversely thereof, said cam blocks being provided on adjacent edges with complementary shoulders the rear sides of which are forwardly inclined, a cam slide disposed between said upper and lower cam blocks and provided with forwardly inclined surfaces coacting with the forwardly inclined surfaces of said cam blocks, spring means tending to move said upper and lower cam blocks toward each other, an upwardly projecting pin on the rear of said cam slide, an arm projecting laterally from the rear of said cam slide, a button feed finger slide slidably mounted on said upper cam block, a button feed finger carried by said slide, said slide being provided with a stop adapted to strike the pin on said cam slide, an arm pivotally mounted on one of said side bars and having a pin and slot connection with said button feed finger slide, a cam slot in said arm, an actuating cam pivotally mounted on the frame, an arm secured to said cam having a laterally projecting pin engaging in said cam slot, a staple forming and driving cam pivotally mounted on said frame, and adapted to be engaged and actuated by said actuating cam, an arm carried by said staple forming and driving cam and adapted to engage the laterally projecting arm of the cam slide, and an operating rod pivotally connected to the rear end of said actuating cam, all coacting substantially as described and for the purpose specified.

23. In a machine of the class described, the combination of a frame comprising a pair of side bars and a head block supported thereon, staple forming and driving mechanism, a lower cam block secured to said head block, an upper cam block slidably mounted on said head block so as to slide transversely thereof, said cam blocks being provided on adjacent edges with complementary shoulders the rear sides of which are forwardly inclined, a cam slide disposed between said upper and lower cam blocks and provided with forwardly inclined surfaces adapted to co-act with the forwardly inclined surfaces of said cam blocks, means engaging said cam slide to force the same forwardly, spring means tending to move the upper and lower cam blocks toward each other, an upwardly projecting pin on the rear of said cam slide, a button feed finger slide slidably mounted in said upper cam block, a button feed finger carried by said slide, a stop carried by said slide and adapted to strike said upwardly projecting pin, an arm pivotally mounted on one of said side bars and having a pin and slot connection with said button feed finger slide, a cam slot in said arm, an actuating cam pivotally mounted on said frame, an arm secured to said cam having a laterally projecting pin engaging in said cam slot, and an operating rod pivotally connected to the rear end of said actuating cam, all coacting substantially as described for the purpose specified.

24. In a machine of the class described, the combination of a frame comprising a pair of side bars and a head block supported thereon, staple forming and driving mechanism, a lower cam block secured to said head block, an upper cam block slidably mounted on said head block so as to slide transversely thereof, said cam blocks being pivoted on adjacent edges with complementary shoulders the rear sides of which are forwardly inclined, a cam slide disposed between said upper and lower cam blocks and provided with forwardly inclined surfaces coacting with the forwardly inclined surfaces of said cam blocks, spring means tending to move said upper and lower cam blocks toward each other, a button feed finger slide slidably mounted on said upper cam block, a button feed finger carried by said slide, means engaging said cam slide to move the same rearwardly, an arm pivotally mounted on one of said side bars and having a pin and slot connection with said button feed finger slide, and means for rocking said arm on its pivot, all coacting substantially as described for the purpose specified.

25. In a machine of the class described, the combination of a frame comprising a pair of side bars and a head block supported thereon, a cam block slidably mounted on said head block, a cam slidably mounted beneath said cam block and adapted to coact therewith to elevate the same, a button feed finger slide slidably mounted on said cam block, a button feed finger carried by said slide, means for reciprocating said button feed finger slide, means for moving said cam slide forwardly, and means for moving said cam slide rearwardly, all coacting substantially as described for the purpose specified.

26. In a machine of the class described, the combination of a frame, a button feed finger slide slidably mounted thereon, a button feed finger carried by said slide, means for reciprocating said button feed finger slide, means for elevating said button feed finger slide at the end of the forward movement thereof, means for depressing said button feed finger slide at the end of the rearward movement thereof, means for holding said button feed finger in elevated position at the end of the rearward movement of said slide, and means for releasing said button feed finger at the beginning of the forward movement thereof, all coacting substantially as described for the purpose specified.

27. In a machine of the class described, the combination of a frame comprising a pair of side bars and a head block supported thereon, a button feed finger slide slidably mounted on said head block, a button feed finger carried by said slide, an arm pivotally mounted on one of said side bars and connected to said button feed finger slide, a cam slot in said arm, said slot being curved rearwardly and then forwardly, an arm pivotally mounted on said frame and having a laterally projecting pin engaging in said cam slot, and an operating rod pivotally connected to the rear end of said arm whereby, as said operating rod is depressed said button feed finger slide will be moved forwardly and then rearwardly, all coating substantially as described for the purpose specified.

28. In a machine of the class described, the combination of a frame, button feeding mechanism, staple forming and driving mechanism, wire feeding mechanism, a cutting knife, a pivot rod carried by said frame, a staple forming cam journaled on said pivot rod and adapted to actuate said staple forming and driving mechanism, a wire feeding cam journaled on said pivot rod adjacent said staple forming and driving cam and provided with an elongated slot, a pin carried by said staple forming cam and disposed in said slot, a pin carried by said wire feeding cam and adapted to actuate said wire feeding mechanism, a second pin carried by said wire feeding cam and adapted to actuate said wire cutting knife, an actuating cam pivotally mounted on said frame and provided with a cam nose engaging cam surfaces provided on the rear of said staple forming cam to rock the same on its pivot, a cam member secured to said actuating cam and provided with a cam surface engaging the rear of said wire feeding cam, to rock the same on its pivot, an arm secured to said actuating cam and connected with the button feeding mechanism to actuate the same, and an operating rod pivotally connected with the rear end of said actuating cam, all coacting substantially as described for the purpose specified.

29. In a machine of the class described, the combination of a frame, button feeding mechanism, staple forming and driving mechanism, wire feeding mechanism, a cutting knife, a pivot rod carried by said frame, a staple forming cam journaled on said pivot rod and adapted to actuate said staple forming and driving mechanism, a wire feeding cam journaled on said pivot rod adjacent said staple forming and driving cam, said cams having a limited movement relative to each other, a pin carried by said wire feeding cam and adapted to actuate said feeding mechanism, a second pin carried by said wire feeding cam and adapted to actuate said wire cutting knife, an actuating cam pivotally mounted on said frame and provided with a cam nose engaging cam surfaces provided on the rear of said staple forming cam to rock the same on its pivot, a cam member secured to said actuating cam and provided with a cam surface engaging the rear of said wire feeding cam to rock the same on its pivot, an arm secured to said actuating cam and connected with the button feeding mechanism to actuate the same, and an operating rod pivotally connected with the rear end of said actuating cam, all coacting substantially as described for the purpose specified.

30. In a machine of the class described, the combination of a frame, button feeding mechanism, staple forming and driving mechanism, a wire feeding mechanism, a wire cutting knife, a suitably pivoted cam adapted to actuate said staple forming and driving mechanism, a second cam suitably pivoted adjacent said first cam and adapted to actuate said wire feeding mechanism and said wire cutting knife, an actuating cam pivotally mounted on said frame and provided with a cam nose engaging the rear of said first cam to rock the same on its pivot, a cam member fixed to said actuating cam and engaging the rear of said second cam to rock the same on its pivot, an arm secured to said actuating cam and connected with the button feeding mechanism to actuate the same, and an operating rod pivotally connected to the rear end of said actuating cam, all coacting substantially as described for the purpose specified.

31. In a machine of the class described, the combination of a standard, a pair of side bars secured to said standard, a head block mounted on said side bars, a top plate supported from said head block, a pair of guide blocks secured to said head block, a staple forming slide slidably carried by said guide blocks, a bar, a staple forming block caried by said bar, an anvil pivotally mounted on said frame, means for rocking said anvil on its pivot, connections between said bar and said anvil whereby as said anvil is rocked on its pivot said bar is reciprocated, means for depressing said forming block below the end of said staple forming slide, means engaging the rear end of said staple forming slide to force it forwardly, a button feed finger slide slidably mounted on said head block, a button feed finger carried thereby, means for reciprocating said button feed finger slide, means for elevating said button feed finger slide at the end of its forward movement, means for depressing said button feed finger slide at the end of its rearward movement, a stop secured to said head block and engaging said button feed finger to hold it elevated adjacent the rear end of said staple forming slide, a button chute terminating adjacent the rear end of said staple forming slide, a wire feed lever pivotally mounted on said top plate, means for rocking said wire feed lever on its pivot, a wire cutting knife slidably mounted in said head block, and means for reciprocating said wire cutting knife, all coacting substantially as described for the purpose specified.

32. In a machine of the class described, the combination of a standard, a pair of side bars secured to said standard, a head block mounted on said side bars, a pair of guide blocks secured to said head block, a staple forming slide slidably carried by said guide blocks, a bar, a staple forming block carried by said bar, an anvil pivotally mounted on said frame, means for rocking said anvil on its pivot, connections between said bar and said anvil whereby, as said anvil is rocked on its pivot, said bar is reciprocated, means for depressing said forming block below the end of said staple forming slide, means engaging the rear end of said staple forming slide to force it forwardly, a button feed finger slide slidably mounted on said head block, a button feed finger carried thereby, means for reciprocating said button feed finger slide, means for elevating said button feed finger slide at the end of its forward movement, means for depressing said button feed finger slide at the end of its rearward movement, a stop secured to said head block and engaging said button feed finger to hold it elevated adjacent the rear end of said staple forming slide, a button chute terminating adjacent the rear end of said staple forming slide, a wire cutting knife slidably mounted in said head block, and means for reciprocating said wire cutting knife, all coacting substantially as described for the purpose specified.

33. In a machine of the class described, the combination of a standard, a pair of side bars secured to said standard, a head block mounted on said side bars, a pair of guide blocks secured to said head block, a staple forming slide slidably carried by said guide blocks, a bar, a staple forming block carried by said bar, an anvil pivotally mounted on said frame, means for rocking said anvil on its pivot, connections between said bar and said anvil whereby, as said anvil is rocked on its pivot, said bar is reciprocated, means for depressing said forming block below the end of said staple forming slide, means engaging the rear end of said staple forming slide to force it forwardly, a button feed finger slide slidably mounted on said head block, a button feed finger carried thereby, means for reciprocating said button feed finger slide, means for elevating said button feed finger slide at the end of its forward movement, means for depressing said button feed finger slide at the end of its rearward movement, a stop secured to said head block and engaging said button feed finger to hold it elevated adjacent the rear end of said staple forming slide, and a button chute terminating adjacent the rear end of said staple forming slide, all coacting substantially as described for the purpose specified.

34. In a machine of the class described, the combination of a standard, a pair of side bars secured to said standard, a head block mounted on said side bars, a pair of guide blocks secured to said head block, a staple forming slide slidably carried by said guide blocks, a bar, a staple forming block carried by said bar, an anvil pivotally mounted on said frame, means for rocking said anvil on its pivot, connections between said bar and said anvil whereby, as said anvil is rocked on its pivot, said bar is reciprocated, means for depressing said forming block below the end of said staple forming slide, means engaging the rear end of said staple forming slide to force it forwardly, a button feed finger slide slidably mounted on said head block, means for reciprocating said button feed finger slide, means for elevating said button feed finger slide at the end of its forward movement, means for depressing said button feed finger slide at the end of its rearward movement, and a button chute terminating adjacent the rear end of said staple forming slide, all coacting substantially as described for the purpose specified.

35. In a machine of the class described, the combination of a standard, a pair of side bars secured to said standard, a head block mounted on said side bars, a staple forming slide, a bar, a staple forming block carried by said bar, an anvil pivotally mounted on said frame, means for rocking said anvil on its pivot, connections between said bar and said anvil whereby, as said anvil is rocked on its pivot, said bar is reciprocated, means for depressing said forming block below the end of said staple forming slide, means engaging the rear end of said staple forming slide to force it forwardly, a button feed finger slide slidably mounted on said head block, means for reciprocating said button feed finger slide, means for elevating said button feed finger slide at the end of its forward movement, means for depressing said button feed finger slide at the end of its rearward movement, and a button chute terminating adjacent the rear end of said staple forming slide, all coacting substantially as described for the purpose specified.

In witness whereof, we have hereunto set our hands and seals in the presence of two witnesses.

MATT M. COREY. [L. S.]
    WILLIAM BOULTHOUSE. [L. S.]

Witnesses:
    ADDIS E. LLOYD,
    A. M. COMSTOCK.